United States Patent [19]
Bertero et al.

[11] Patent Number: 6,150,015
[45] Date of Patent: Nov. 21, 2000

[54] ULTRA-THIN NUCLEATION LAYER FOR MAGNETIC THIN FILM MEDIA AND THE METHOD FOR MANUFACTURING THE SAME

[75] Inventors: Gerardo Bertero, Redwood City; Charles Changqing Chen, Milpitas; Tu Chen, Monte Sereno; Tsutomu Yamashita, San Jose, all of Calif.; Makoto Imakawa, Sendai; Michinobu Suekane, Hino, both of Japan

[73] Assignee: Komag, Incorporated, San Jose, Calif.

[21] Appl. No.: 08/984,753

[22] Filed: Dec. 4, 1997

[51] Int. Cl.$^7$ ........................................... G11B 5/66
[52] U.S. Cl. ............... 428/332; 428/336; 428/694 T; 428/694 TS; 428/694 TM; 428/900; 427/128; 427/129; 427/130; 427/131; 204/192.2
[58] Field of Search ................ 428/634 T, 634 TS, 428/634 TM, 900, 332, 336; 427/128–131; 204/192.2

[56] References Cited

U.S. PATENT DOCUMENTS

| | | | |
|---|---|---|---|
| 4,652,499 | 3/1987 | Howard et al. | 428/641 |
| 4,735,840 | 4/1988 | Hedgcoth | 428/65.5 |
| 4,894,133 | 1/1990 | Hedgcoth | 204/192.15 |
| 5,051,288 | 9/1991 | Ahlert | 428/65.7 |
| 5,063,120 | 11/1991 | Edmonson et al. | 428/694 BU |
| 5,082,747 | 1/1992 | Hedgcoth | 428/611 |
| 5,316,864 | 5/1994 | Hedgcoth | 428/611 |
| 5,462,796 | 10/1995 | Teng | 428/336 |
| 5,534,355 | 7/1996 | Okuno et al. | 428/611 |
| 5,569,533 | 10/1996 | Lal et al. | 428/332 |
| 5,587,235 | 12/1996 | Suzuki et al. | 428/332 |
| 5,607,740 | 3/1997 | Noda | 428/65.3 |
| 5,616,370 | 4/1997 | Okuno et al. | 427/547 |
| 5,626,970 | 5/1997 | Hedgcoth | 428/611 |
| 5,693,426 | 12/1997 | Lee | 428/611 |
| 5,696,653 | 12/1997 | Lacey | 356/243.3 |
| 5,738,945 | 4/1998 | Lol | 428/611 |

(List continued on next page.)

FOREIGN PATENT DOCUMENTS

| | | |
|---|---|---|
| 704839A1 | 4/1996 | European Pat. Off. . |
| 3277487 | 10/1991 | Japan . |
| 3298493 | 10/1991 | Japan . |
| 5109043 | 4/1993 | Japan . |
| 5120663 | 5/1993 | Japan . |
| 6285325 | 10/1994 | Japan . |
| 6277893 | 11/1994 | Japan . |
| 7150533 | 5/1995 | Japan . |
| 8147660 | 6/1996 | Japan . |

OTHER PUBLICATIONS

Williams and Comstock, "An Analytical Model of the Write Process in Digital Magnetic Recording", 17th Annual AIP Conf. Proc., Part I, No. 5, 1971, pp. 738–742.

(List continued on next page.)

*Primary Examiner*—Leszek Kiliman
*Attorney, Agent, or Firm*—Keith G. Askoff

[57] ABSTRACT

In this invention, an ultra thin layer of CoCr alloy nucleation layer is sputtered at an extremely low deposition rate above a predominantly (200) oriented Cr film followed by a CoCrPt based alloy sputtered film at higher rates and moderate temperatures. This structure creates a media which has very high Hc, and excellent PW50, low noise and excellent low TNLD values. By using this technique, the CoCrPt magnetic film achieves excellent in-plane crystallographic orientation, and high Hc is achieved with minimal amount of Pt addition to the magnetic film. The method allows very fine grain structure of cobalt to be formed which contributes to good signal to noise ratio. A fine grain structure combined with chromium segregation between the grains improve the signal to noise ratio even more. A high degree of in-plane c-axis orientation is achieved in the cobalt layer which provides very high hysteresis loop squareness which helps to improve the OW and TNLD. The perfection of the grains is very high so that high anisotropy is obtained in the magnetic layer, resulting in high Hc without the necessity of addition of high level of Pt. The high degree of crystalline perfection also contributes to low TNLD.

52 Claims, 11 Drawing Sheets

U.S. PATENT DOCUMENTS

| | | | |
|---|---|---|---|
| 5,763,071 | 6/1998 | Chen | 428/332 |
| 5,820,963 | 10/1998 | Lu et al. | 428/65.3 |
| 5,824,409 | 10/1998 | Sellmyer et al. | 428/332 |
| 5,830,569 | 11/1998 | Hikosaka et al. | 428/332 |
| 5,840,394 | 11/1998 | Ranjan et al. | 428/65.3 |
| 5,851,656 | 12/1998 | Ohkubo | 428/332 |
| 5,900,324 | 5/1999 | Moroishi et al. | 428/611 |
| 5,922,442 | 7/1999 | Lal et al. | 428/216 |
| 6,036,824 | 3/2000 | Hedgcoth | 204/192.16 |

OTHER PUBLICATIONS

Zhu et. al., "Micromagnetic Studies of Thin Metallic Films", Journal of Applied Physics, vol. 63, No. 8, 1988, p. 3248.

Chen et. al., "Physical Origin of Limits in the Performance of Thin–Film Longitudinal Recording Media", IEEE Trans. Mag., vol. 24, No. 6, 1988, p. 2700.

Daval, J. and Randet, D., "Electron Microscopy on High Coercive Force Co–Cr Composite Films", IEEE Trans. Mag., MAG–5, No. 4, Dec. 1970, p. 768–773.

Lazarri, J.P. et al., "Experimental Studies Using In–Contact Recording on Chromium–Cobalt Films", IEEE Transactions on Magnetics, vol. MAG–5, No. 4, Dec. 1969, p. 955–959.

Nolan, T.P. et al., "Effect of Microstructural Features on Media Noise in Longitudinal Recording Media", Journal of Applied Physics, vol. 73, No. 10, May 15, 1993, p. 5566–5568.

Hono K., et al., "Crystallography of Co/Cr Bilayer Magnetic Thin Films", Journal of Applied Physics, vol. 68, No. 9, Nov. 1, 1990, p. 4734–4740.

Deng, Y. et al., "Magnetic Properties and Crystal Texture of Co Alloy Thin Films Prepared on Double Bias Cr", Journal of Applied Physics, vol. 73, No. 10, May 15, 1993, p. 6677–6679.

Tsai, H.C. et al., "Preffered Orientation in Cr–and Co–Based Thin Films and its Effects on the Read/Write Performance of the Media", Journal of Applied Physics, vol. 71, No. 7, Apr. 1, 1992, p. 3579–3585.

Lee et al., "NiAl Underlayers for CoCrTa Magnetic Thin Films", IEEE Trans. On Mag., vol. 30, No. 6, Nov. 1994, pp. 3951–3953.

Lee et al., "Effects of Cr Intermediate Layers on CoCrPt Thin Film Media on NiAl Unerlayers", IEEE Trans. On Mag., vol. 31, No. 6, Nov. 1995, pp. 2728–2730.

Yamaguchi et al, "Recording Characteristics of CoCrTa, CoCrPt Double Layer", 15th Annual Japanese Applied Magnetic Conference, 1991, Paper 1aA–11.

Kodama, K. et al., "Magnetic Properties of CoCrTa, CoCrPt Double Layers", 15th Annual Japanese Applied Magnetic Conference, 1991, Paper 1aA–10.

Glijer P., et al., "Advanced Multilayer Thin Films for Ultra–High Density Magnetic Recording Media", IEEE Transactions on Magnetic, vol. 30, No. 6, Nov. 1994, p. 3957–3959.

Fang, Leo Li Zen and Lambeth, David N., "New High Coercivity Cobalt Alloy Thin Film Medium Structure for Longitudinal Recording", Applied Physics Letters, vol. 65, No. 24, Dec. 1994.

Zhang, B. et al., "CoCrTa/CoCrPtTa Double Layer Films for Magnetic Recording", IEEE Transactons on Magnetics, vol. 32, No. 5, Sep. 5, 1996, p. 3590–3592.

Zou, J. et al., "CoCrTa Intermediate Layers on NiAl Underlayers for CoCrPt Longitudinal Thin Film Magnetic Media", MMM Intermag Conf., Jan. 1998, Abstract No. CC–09.

Takahashi M. et al. . , "The Ultra Clean Sputtering Process and High Density Magnetic Recording Media", IEEE Transactions on Magnetics, vol. 33, No. 5, Sep. 1997, p. 2938–2943.

Nguyen, T.A. and Howard, J.K., "Enhanced Coercivity in CoPtCr Thin Film Media using CrV Underlayer", Journal of Applied Physics, vol. 73, No. 10, May 1993, p. 5579.

Lazarri, J.P. et al., "Thin Evaporated Films with High Coercive Force", IEEE Transactions on Magnetics, MAG–3, Sep. 1967, p. 205–207.

Lal, B. et al., "Effect of Very Thin Cr–Underlayer on The Magnetic and Recording Properties of CoCrTa Thin–Film Media", IEEE Transactions on Magnetics, vol. 30, No. 6, Nov. 1994, p. 3954–3956.

Sanders, I.L. et al., "Media Noise in Periodic Multilayered Magnetic Films with Perpendicular Anisotropy", Journal of Applied Physics, vol. 68, No. 4, Aug. 15, 1990, p. 1791–1795.

Sellmyer, D.J. and Wang, D., "Magnetic and Structural Properties of CoCrTa Films and Multilayers with Cr", Journal of Applied Physics, vol. 67, No. 9, May 1, 1990, p. 4710–4712.

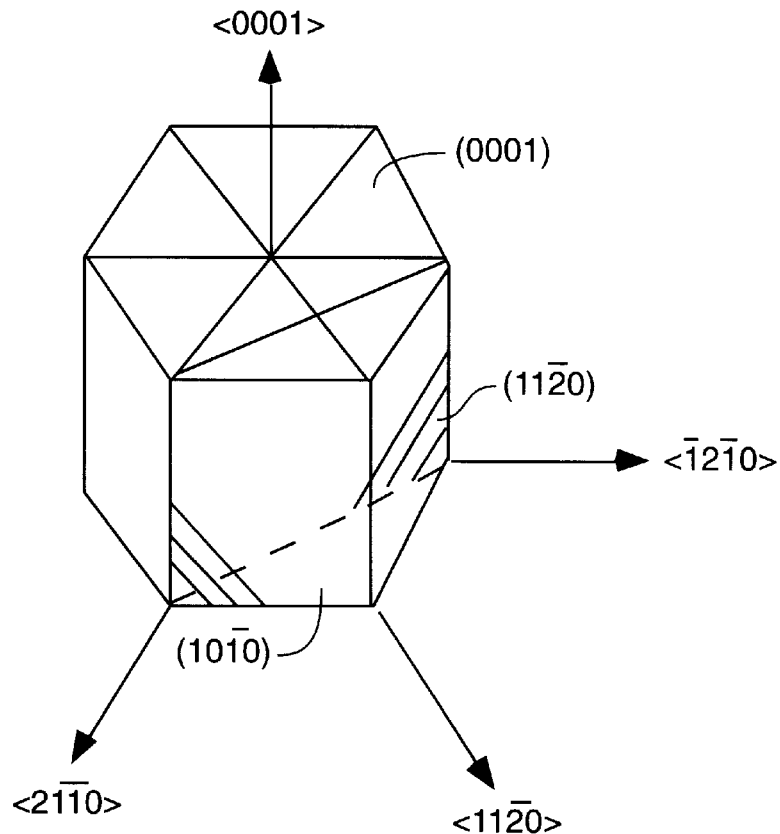
FIG._1
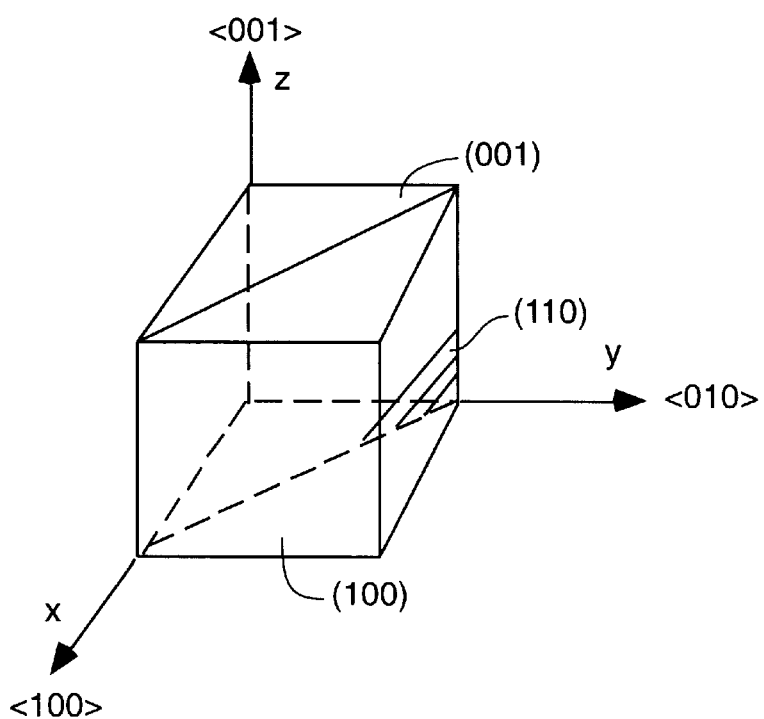
FIG._2

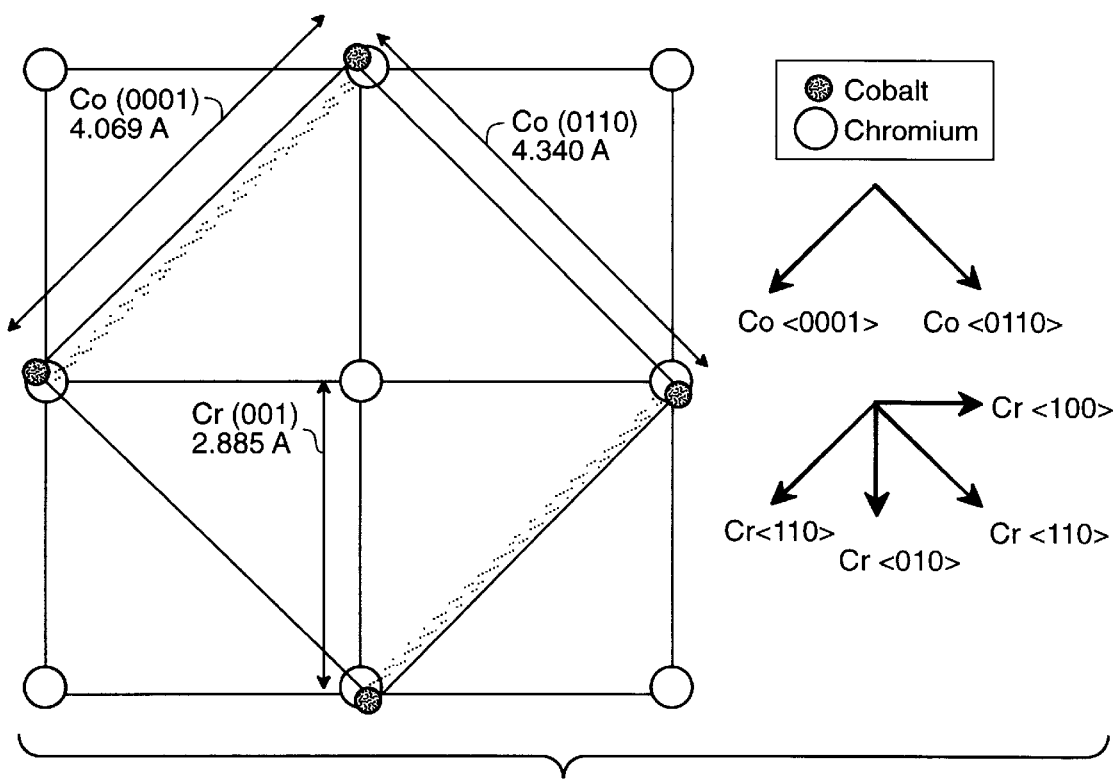
FIG._3
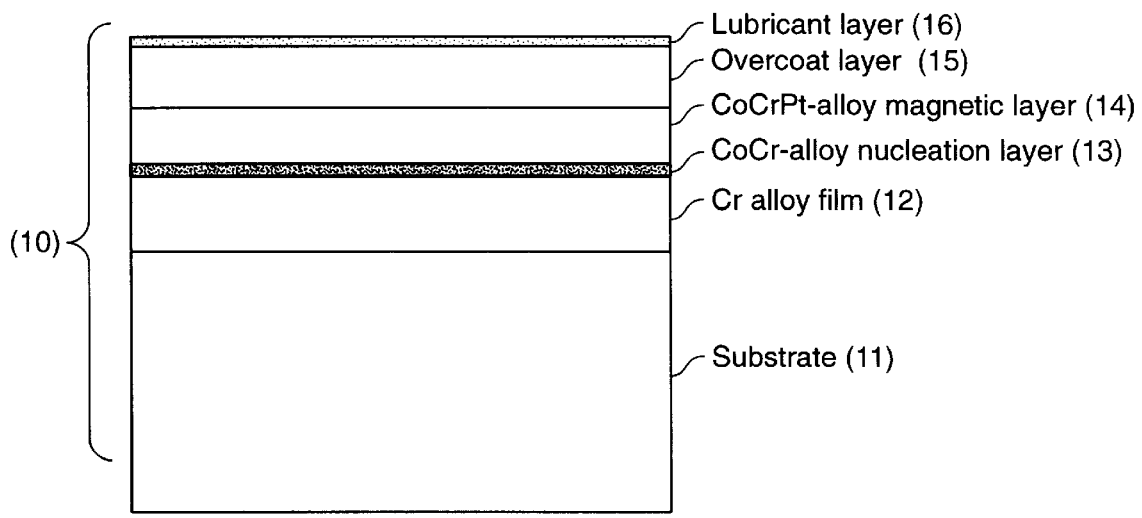
FIG._4

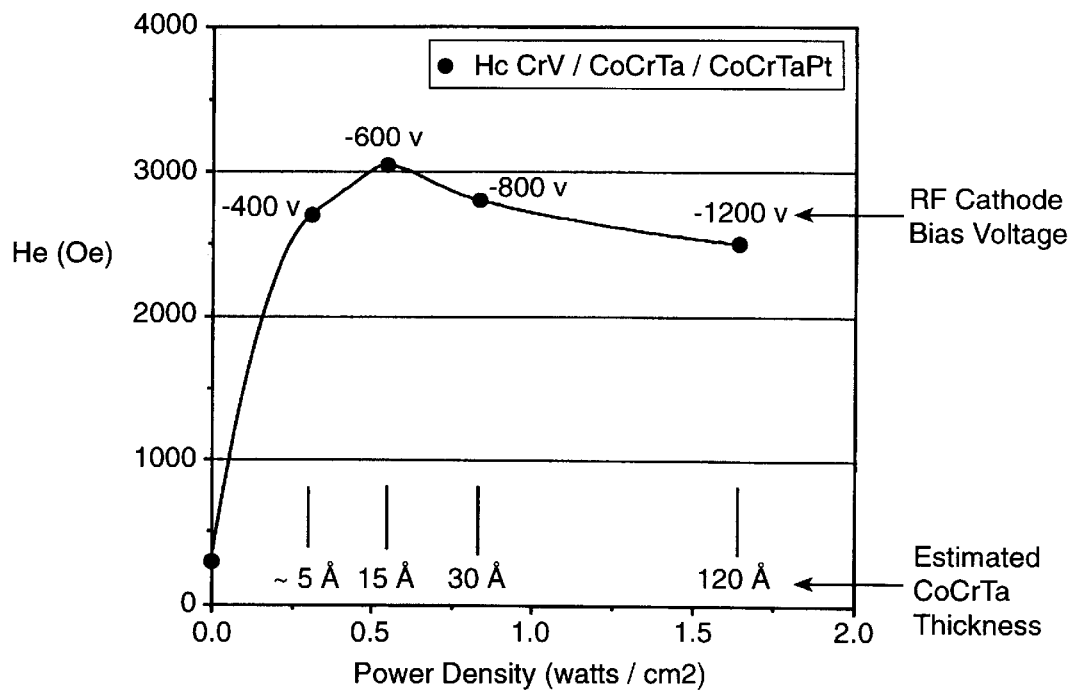
*FIG._5*
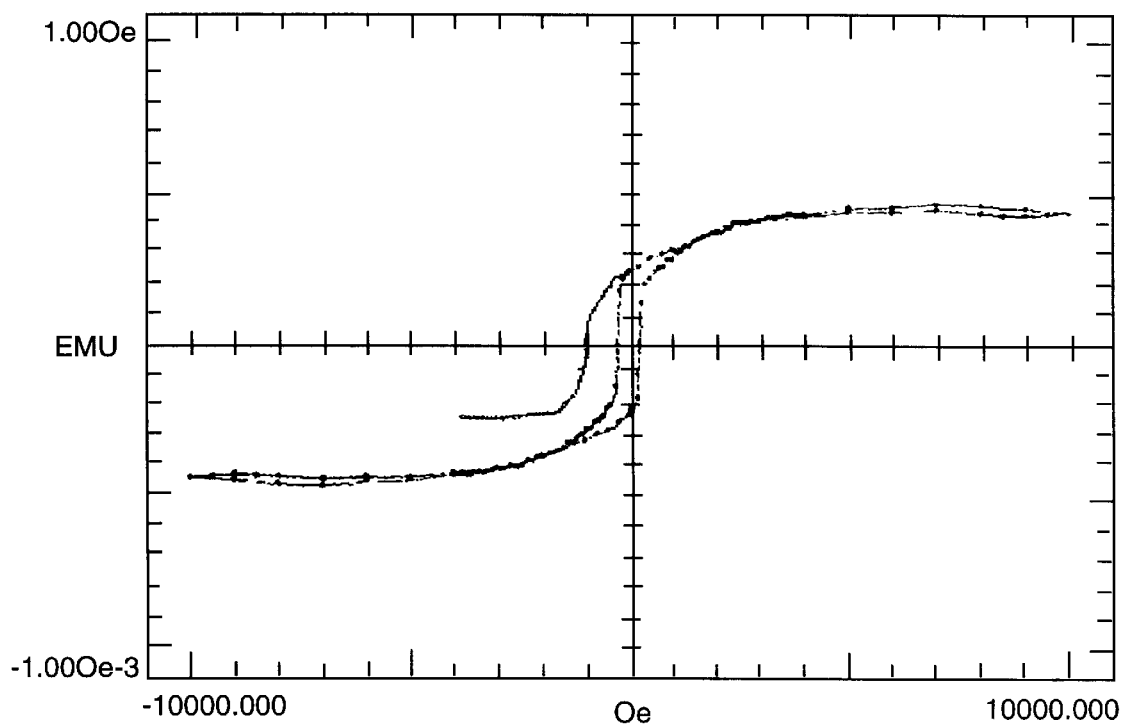
*FIG._6*

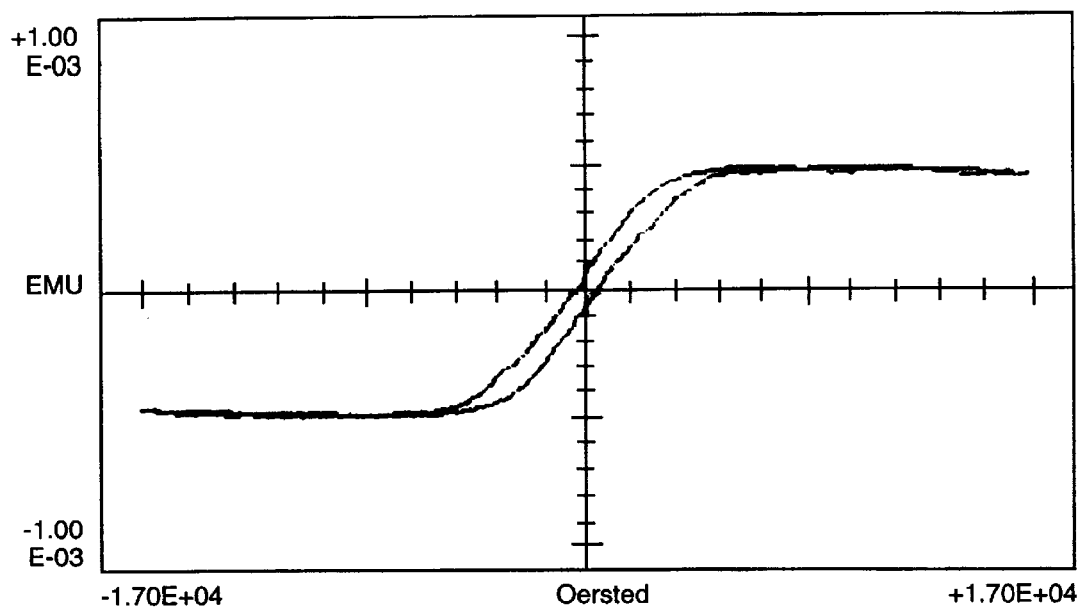
FIG._7
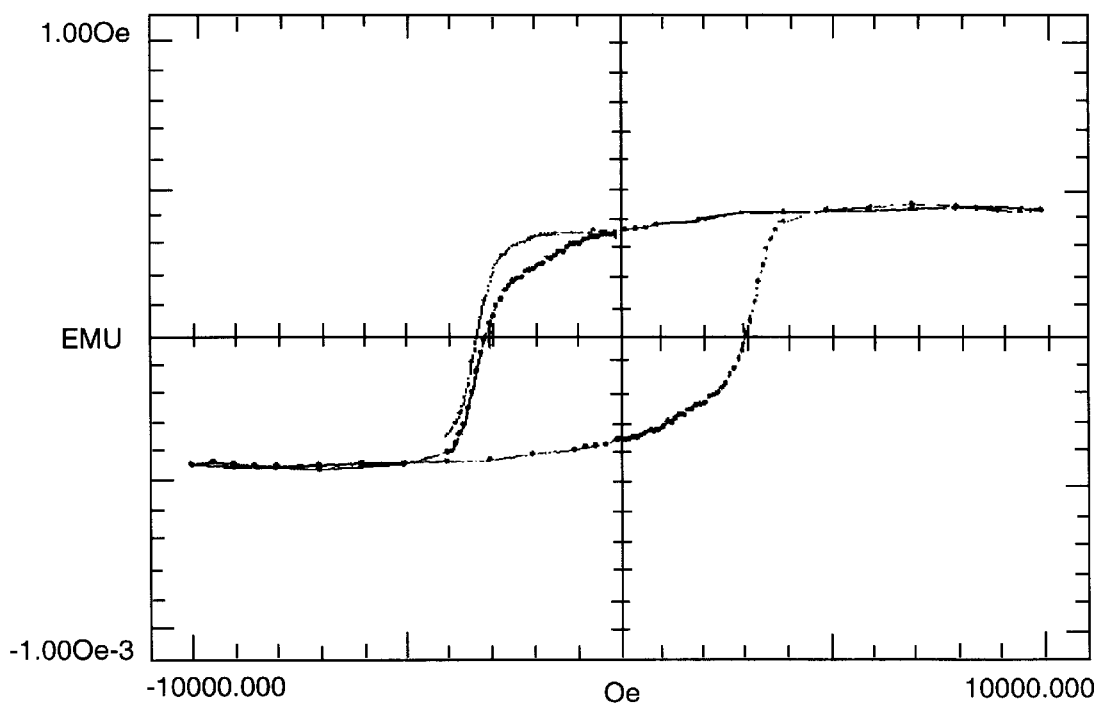
FIG._8

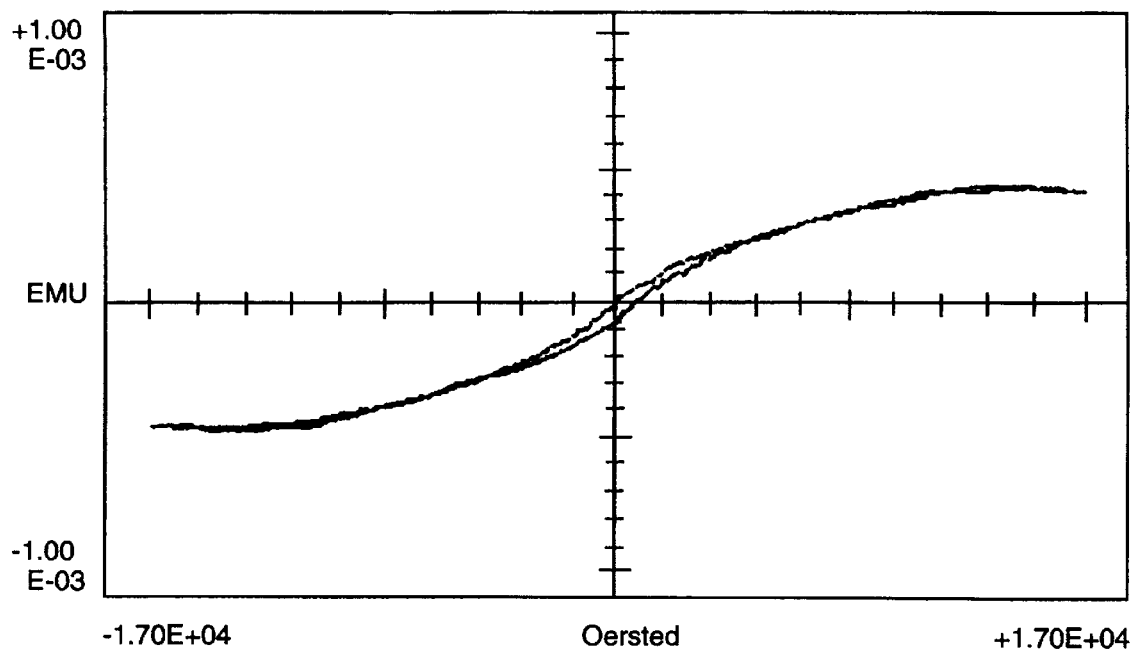
FIG._9
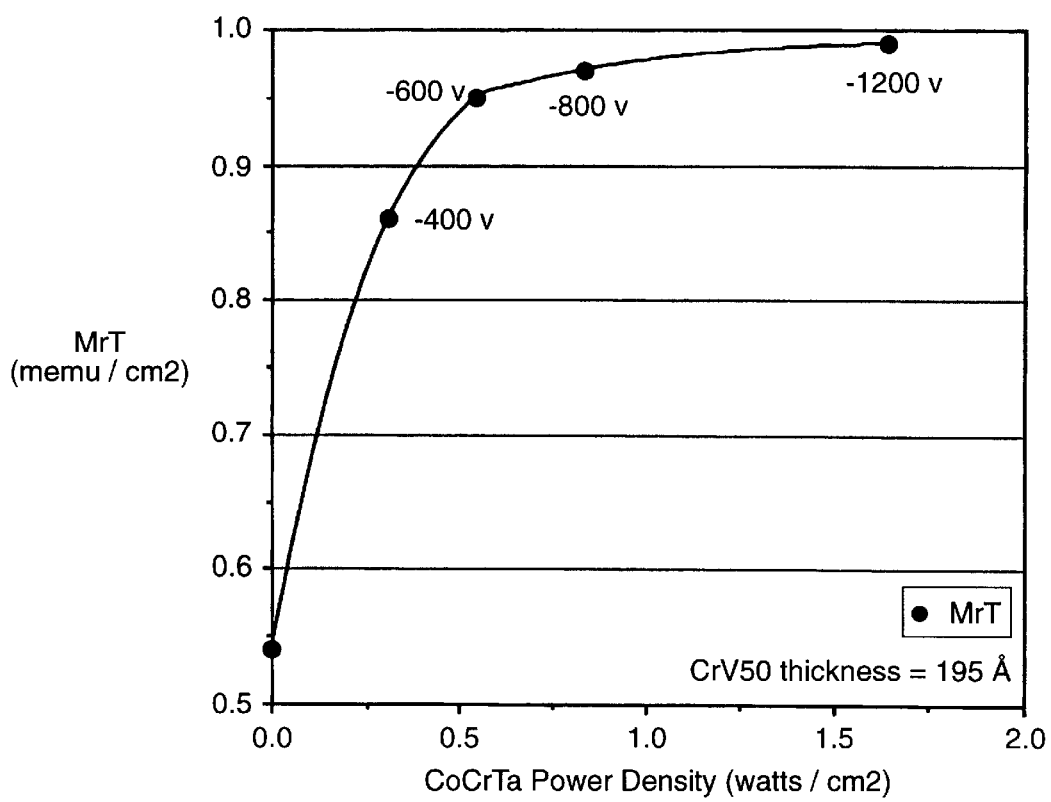
FIG._10

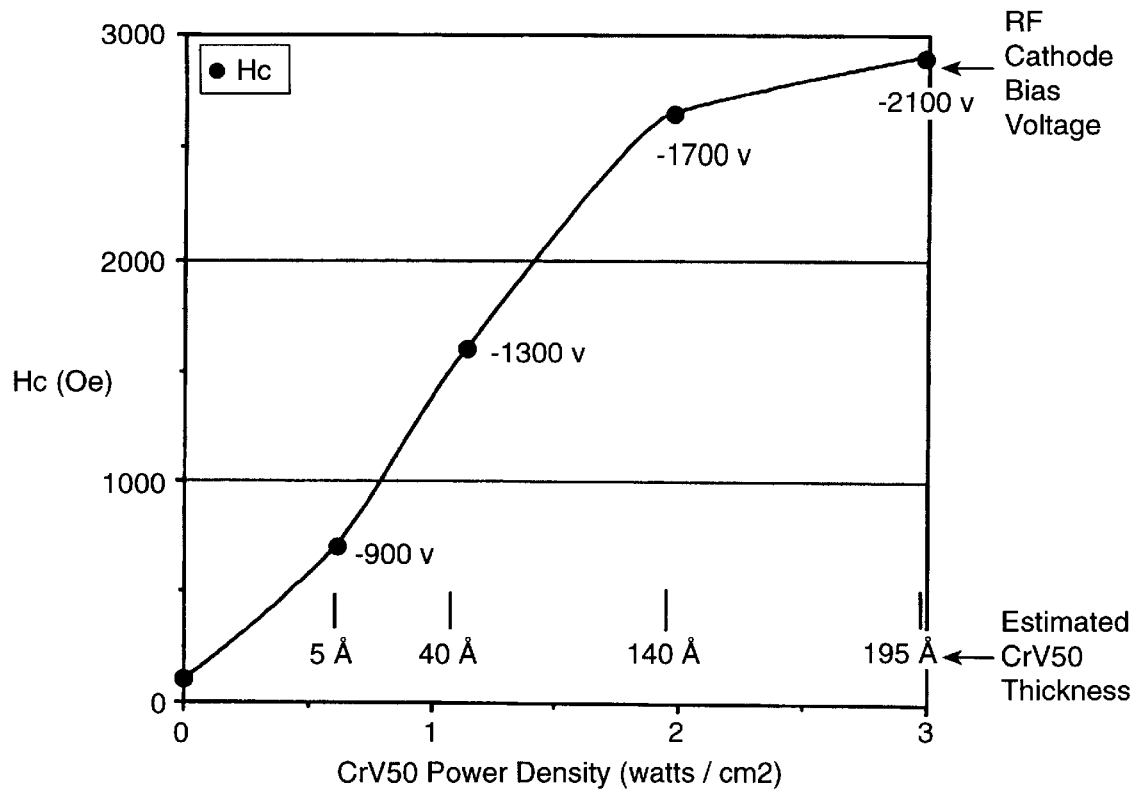
FIG._11
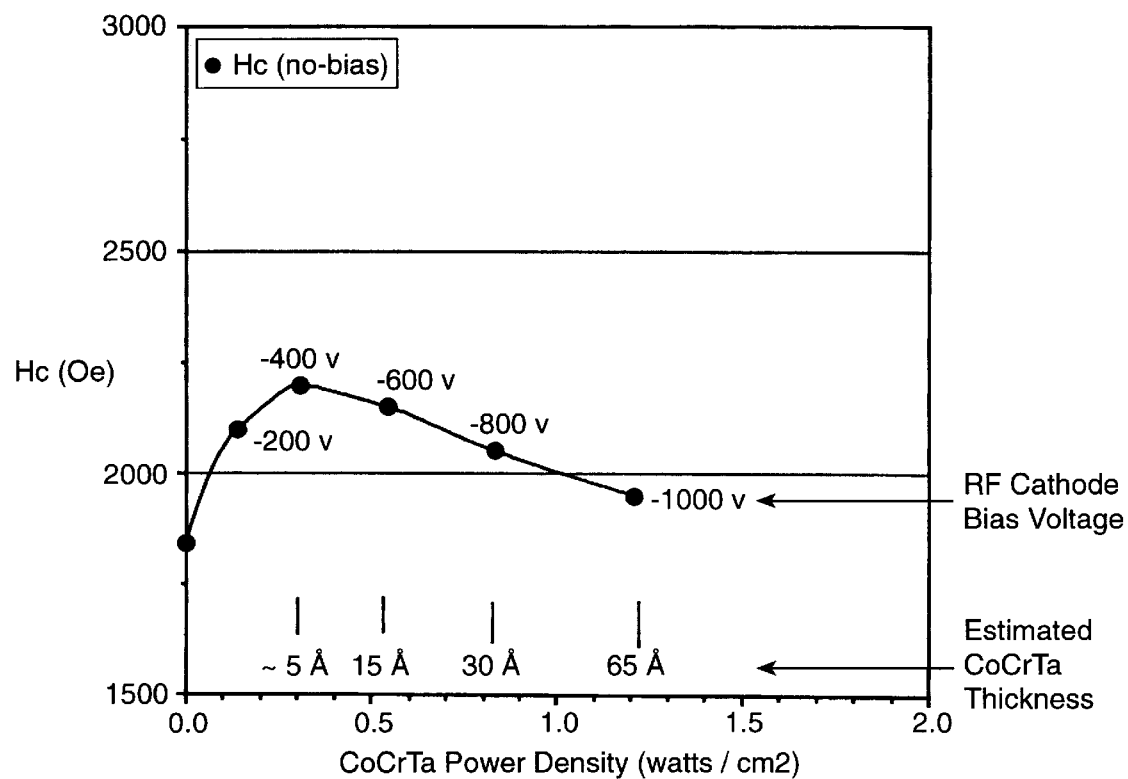
FIG._12

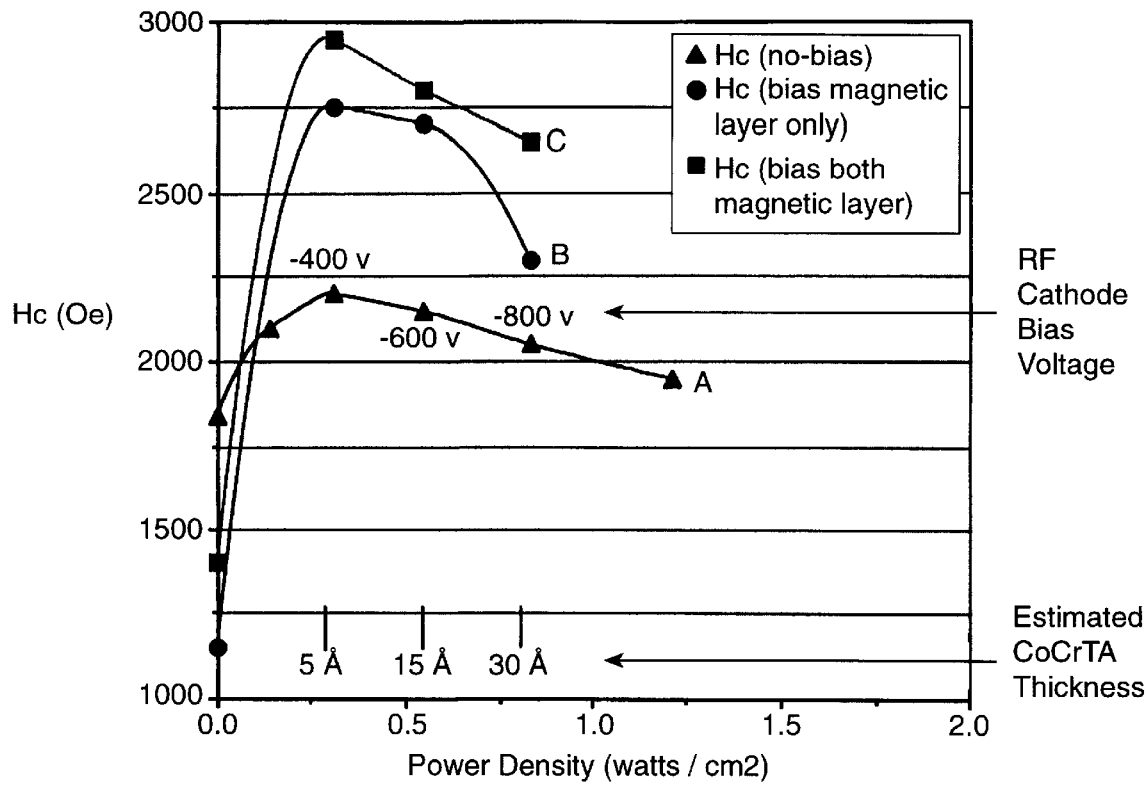
FIG._13
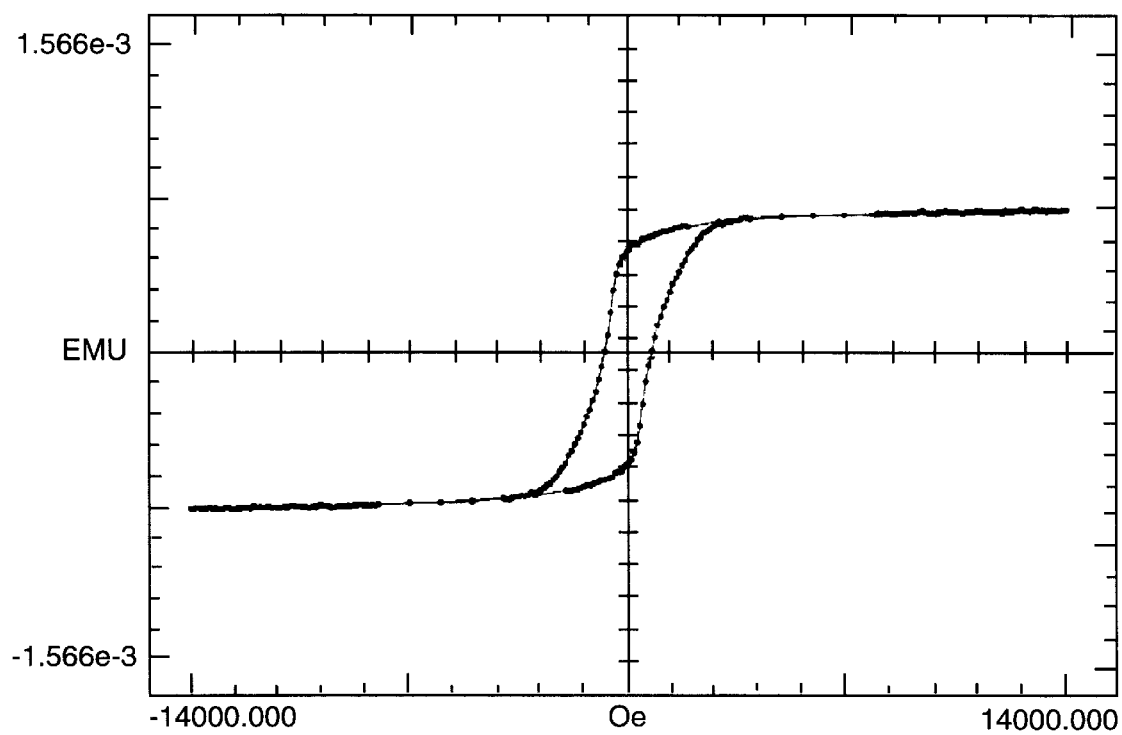
FIG._14

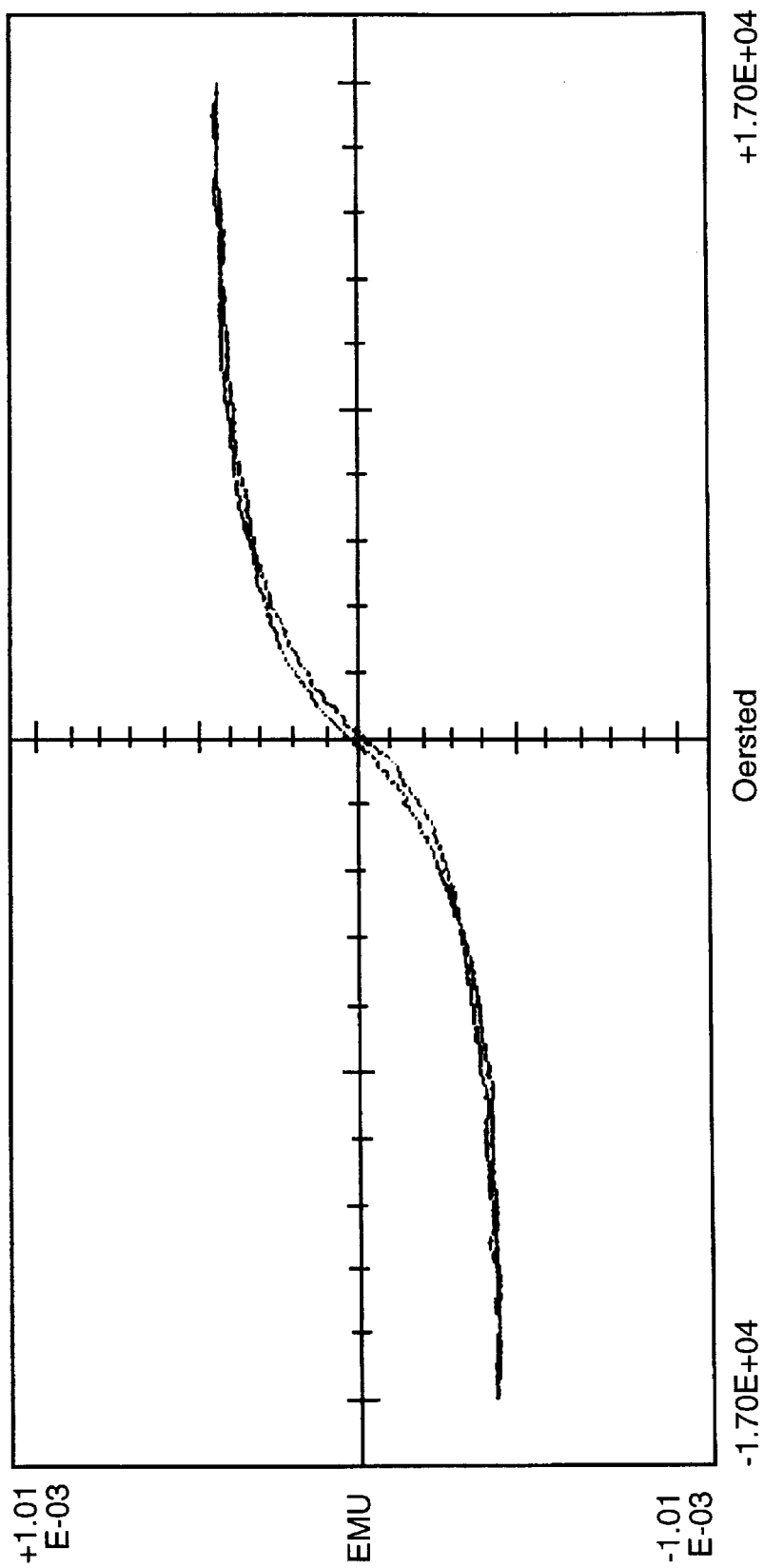
FIG._15

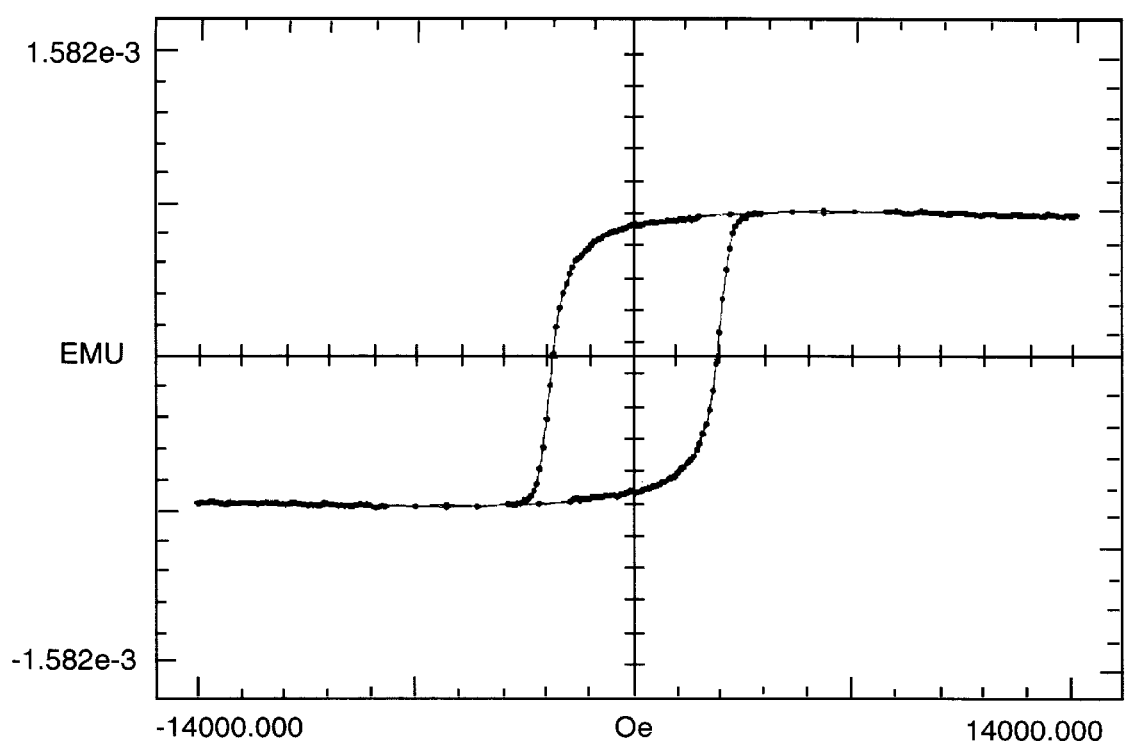
FIG._16

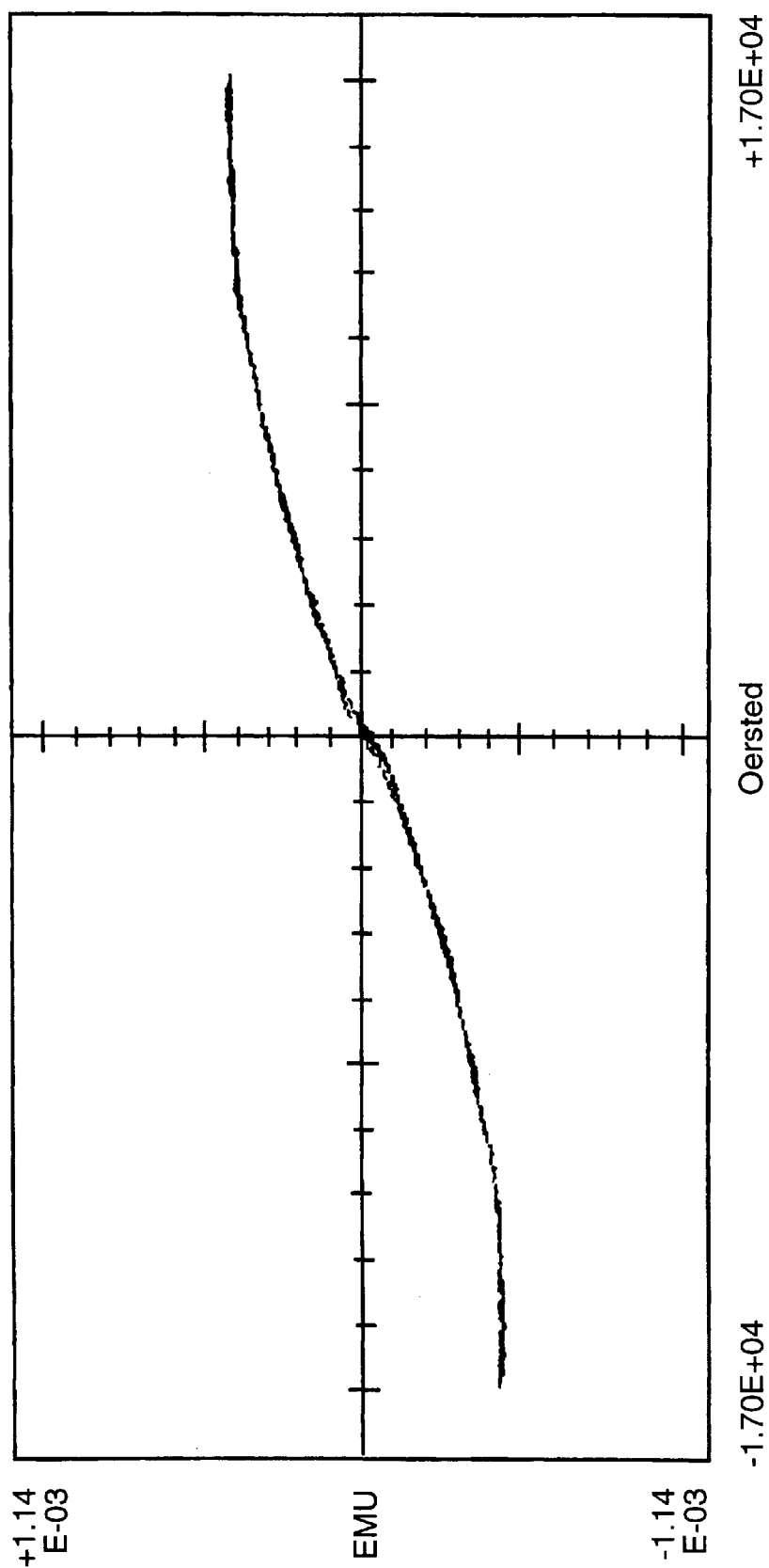
FIG._17

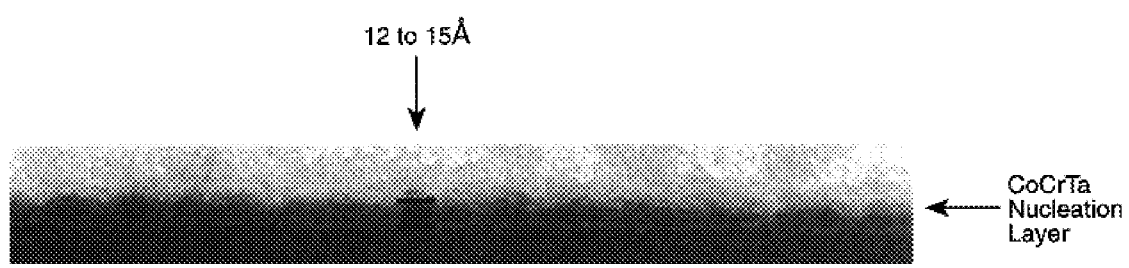
FIG._18

ULTRA-THIN NUCLEATION LAYER FOR MAGNETIC THIN FILM MEDIA AND THE METHOD FOR MANUFACTURING THE SAME

FIELD OF THE INVENTION

The present invention relates generally to magnetic recording media used in rigid disc drives commonly used for computer data storage and methods of making the same.

BACKGROUND

In the hard disk drive industry, the ever-increasing recording density demands continuous improvement in hard disk recording media so as to support a higher linear recording density (thousands of flux changes per inch—KFCI) and track density (thousands of tracks per inch—KTPI). Recording density is proportional to the product of KFCI and KTPI, and is typically expressed as giga-bits per square inch ($Gb/in^2$). Currently the recording density is increasing at compound annual growth rate of 60%.

In order for the media to be able to support the high KFCI (e.g., over 200 KFCI), the pulse width ($PW_{50}$—pulse width at 50% of pulse amplitude) needs to be as small as possible to reduce the inter-symbol interference so that high resolution at high recording density can be obtained. The resolution is defined as the pulse amplitude at high frequency divided by the pulse amplitude at low frequency. Based on generally known magnetic recording theory, in order to reduce $PW_{50}$ and hence increase resolution, the magnetic recording media must have high coercivity, Hc. For today's typical recording density of 2 $Gb/in^2$, the value of Hc needs to be on the order of 2500 Oe, and in future it needs to be 3000 Oe or more for even higher recording density. Other means of reducing $PW_{50}$ include increasing the hysteresis loop squareness, generally defined as "S" which is ratio of remanent to saturation magnetization (Mr/Ms), increasing the coercivity squareness "S*", increasing the remanent coercivity squareness "$S^*_{rem}$", and narrowing the switching field distribution ("SFD"), as described by William and Comstock in "An Analytical Model of the Write Process in Digital Magnetic Recording," A.I.P. Conference Proceedings on Magnetic Materials 5, p. 738 (1971).

For increased TPI, the media should also have high $H_c$ to support a high off track compressibility (OTC). OTC is the measure of how much the individual tracks can be squeezed together before they start to interfere with each other and degrade the error rate of the track being squeezed. For example, in order to support 10 KTPI, the $H_c$ of the media should be equal to or higher than 2500 Oe. In summary, in order for the media to be able to support high areal recording density, $H_c$ of the media must be as high as possible.

Other parameters of importance for recording performance are overwrite (OW), signal to noise ratio (SNR), and total non-linear distortion (TNLD). Overwrite is a measure of the ability of the medium to accommodate overwriting of existing data. In another words, OW is a measure of what remains of a first signal after a second signal (for example of a different frequency) has been written over the original data. OW will be low or poor when a significant amount of the first signal still remains after over-writing. OW is generally affected by the coercivity, the squareness, and the SFD of the medium. For future high density recording, higher Hc media will be preferred for narrower $PW_{50}$ and high resolution. However, an increase in Hc is generally accompanied by reduction in OW. Thus, there is a need in the art to improve the S* and the SFD to obtain improvements in OW for a given Hc. High hysteresis loop squareness and narrow switching field distribution can be obtained by having uniform distribution of the grain size of the media.

Another factor which is important for increased KFCI and KTPI is that the signal to noise ratio must be maximized. There are contributions to SNR from the electronics and the channel used to process the magnetic signal. But there is also intrinsic noise from the media that must be minimized. The largest contribution to the media noise is generated from the interparticle (or intercrystalline) magnetic exchange interaction. To suppress this exchange interaction, one must isolate the magnetic crystals from each other by one or more nonmagnetic elements (such as Cr atom) or compounds. The amount of separation need be only a few angstroms for there to be a significant reduction in intergranular exchange coupling. Another source of intrinsic media noise is the size or dimension of the magnetic grain. As the recording density approaches 2 $Gb/in^2$ and beyond, the bit size along the track will be in the order of 0.1 $\mu m$ or less. Therefore to prevent the excessive noise arising from the physical dimensions of the grain, the diameter of each magnetic grain on the average should be approximately 0.01 $\mu m$ (10 nm) or less for media in the 2.0–2.5 $Gb/in^2$ media range. The grain size should be approximately 7.5 nm or less for 5 $Gb/in^2$ media, and should be approximately 5 nm or less for 10 $Gb/in^2$ media. Intrinsic media noise has been theoretically modeled by J. Zhu et al. in "Micromagnetic Studies of Thin Metallic Films" in Journal of Applied Physics, Vol. 63, No. 8, (1988) p. 3248–53 which is incorporated by reference herein. T. Chen et al. also describe the source of intrinsic media noise in "Physical Origin of Limits in the Performance of Thin-Film Longitudinal Recording Media" in IEEE Transactions on Magnetic, Vol. 24, No. 6, (1988) p. 2700–05 which is also incorporated by reference herein.

There is another intergranular interaction, called magnetostatic interaction, which acts over a much greater distance between particles as compared to the exchange interaction. Reducing the magnetostatic interaction does reduce intrinsic media noise slightly. However, the effects of magnetostatic interaction actually improve hysteresis loop squareness and narrow the switching field distribution (but to a lesser extent than the exchange interaction), and hence improve $PW_{50}$ and OW. Therefore, magnetostatic interaction is generally desirable and hence tolerated.

Total non-linear distortion (TNLD) is another parameter that needs to be reduced for high density recording, and it comes about from intersymbol interference between adjacent bits, and partial erasure of a bit at the transition during writing. TNLD can be reduced by increasing the coercivity, reducing the remanent magnetization Mr, and reducing the film thickness T, for a reduction in remanence thickness product MrT. TNLD is also improved by orienting the easy magnetization direction of the magnetic particles in the plane of the media. Increasing the Hc is desirable not only for TNLD but also for $PW_{50}$ as mentioned previously. Since TNLD increases as the recording density increases, it is becoming an important parameter for higher recording density.

In order to obtain the best performance from the magnetic media, each of the above criteria such as $PW_{50}$, resolution, OW, SNR, and TNLD must be optimized. This is a formidable task, as each of these performance criteria are interrelated. For example, obtaining a narrower $PW_{50}$ and reducing TNLD by increasing the Hc will adversely affect OW. A thinner medium also provides narrower $PW_{50}$, better OW, and lower TNLD, however the SNR decreases because the media signal itself is reduced. Increasing squareness of the hysteresis loop contributes to narrower PW50, better OW, and lower TNLD, but may increase noise due to intergranular exchange coupling and magnetostatic interaction. The media noise can be reduced by decreasing the grain of the media, however smaller grain size may reduce Hc due to onset of super-paramagnetic effect which comes about due to inability of the grain to support the magnetization when it competes with the thermal fluctuation. In general, the effect of onset of super-paramagnetic can be delayed by increasing the $K_u$ of the magnetic grain through addition of platinum which has high orbital moment, and also improving the crystalline perfection of the hexagonal close packed (HCP) cobalt grains.

Therefore, an optimal thin film magnetic recording medium for high density recording applications that can support high bit density will require low noise and high signal without adversely sacrificing $PW_{50}$, OW and TNLD. The cobalt alloy which is currently used for optimization of certain of the above performance criteria typically includes the addition of chromium (Cr), tantalum (Ta) and platinum (Pt), due to their ability to provide high Hc and high magnetic moment. Chromium is typically added in the amount greater than 10 atomic % to act as segregant to separate the cobalt alloy grains for noise reduction and for corrosion resistance. Other additives such as Ti, V, W, Mo are sometimes used. In all cases, the cobalt crystal structure must be hexagonal close-packed (HCP), and it is preferable to have the c-axis of the grains oriented in the film plane. This is accomplished by depositing a chromium film below the cobalt layer and arranging for the epitaxial growth of cobalt alloy grain above the chromium layer. In order to describe the crystallography of the cobalt alloy and chromium, planes and directions in the crystal are denoted by generally accepted conventions, such as described in "Elements of X-ray Diffraction" by B. D. Cullity published by Addison-Wesley Publishing Co. Inc., herein incorporated by reference. It is typical to describe the crystallographic planes and directions in hexagonal crystals such as cobalt by a 4 indices notation called *Miller-Bravais* indices, while cubic structure crystals such as chromium are denoted by 3 indices notation called *Miller* indices. Brackets, "< >" are used to describe crystallographic directions, while parenthesis "( )" are used to denote specific planes. "{ }" are used to denote a class of planes which are crystallographically equivalent. For example with chromium with body-centered (BCC) crystallographic structure, <001> direction is normal to a (001) plane. For a hexagonal crystal structure such as cobalt, the crystal surface with the most dense atomic packing is the (0001) plane and the direction normal to that plane is <0001> direction. The <0001> direction is often referred to as the c-axis as described earlier. The crystallographic directions and the surfaces for cobalt are shown in FIG. 1 and those for chromium are shown in FIG. 2.

The crystallographic orientation relationship that occurs between hexagonal cobalt film and BCC chromium film was originally reported by J. Daval & D. Randet in "Electron microscopy on High-coercive-force Co-Cr Composite Films" in IEEE Transaction on Magnetics, MAG-6, No. 4, (1970) p. 768–73. This work was preceded by work by J. P. Lazzari, I. Melnick and D. Randet in "Experimental studies using in-contact recording on chromium-cobalt films" in IEEE Transactions on Magnetics, Vol. MAG-5, No. 4, (1969) p. 955–59 where they reported that Hc of the cobalt film is increased by its deposition on top of a chromium underlayer.

The crystallographic orientation of chromium which promotes the cobalt c-axis to lie in the plane of the film is to arrange for chromium film to grow with <001> preferred growth, which means that {001} type planes of chromium lie in the plane of the film. It has been found that cobalt {11$\bar{2}$0} type planes match well with the atoms on a {001}$_{Cr}$ plane as shown in FIG. 3 hereof. Lattice spacings for pure Cr ($a_o$=2.885 Å) and pure Co (c=4.069 Å, $a_o$=2.507 Å) are illustrated in FIG. 3. As seen in the Figure, the <0001> direction of cobalt is aligned with the <110> direction of the chromium lattice in the plane of epitaxy. In this direction, the Cr and Co lattices are closely matched and the mismatch is around 0.3%. Along the orthogonal direction (<01$\bar{1}$0>$_{Co}$), the mismatch with the Cr lattice is much larger at around 6.4%. In this orientation relationship between cobalt and chromium, the lattice match is close only in one direction. The same holds true for alloys of cobalt. It should also be pointed out that in the above orientation relationship between chromium and cobalt, there are two equally plausible configuration for the cobalt. The <0001>$_{Co}$ direction can lie along two orthogonal <110>$_{Cr}$ type directions. In fact when the chromium grains are large, two variants of cobalt grains which are oriented 90° to each other can form on the {001} surface of the chromium grains as described in "Effect of Microstructural Features on Media Noise in Longitudinal Recording Media" by T. Nolan et al. published in Journal of Applied Physics, 73(10), 15 May (1994) p. 5566–68.

A large variety of cobalt alloys have been used with a Cr undercoat. In its current industrial form, the Cr undercoat thickness is typically between 500 to 2000 Å, and it is deposited on a heated substrate. A high degree of epitaxy between the Cr and the magnetic layer is required in order to obtain high Hc and high hysteresis loop squareness. Typically, Cr grows with strong <100> orientation above 200° C. In the plane of the film, the epitaxial relationship is <110>$_{Cr}$//<0001>$_{Co}$, and {100}$_{Cr}$//{11$\bar{2}$0}$_{Co}$ where "//" denotes "parallel to". Alloying elements can be added to either chromium and cobalt or to both to attempt to match the lattice better. As mentioned before however, only one direction along the crystallographic direction can be truly matched, while the other direction (orthogonal) will always be mismatched in the above epitaxial orientation.

More recently, it has been shown by K. Hono, B. Wong, and D. E. Laughlin in the article "Crystallography of Co/Cr Bilayer Magnetic Thin Films" in Journal of Applied Physics 68(9) (1990) p.4734–40 that in-plane c-axis orientation may be achieved through other crystallographic relationship between Cr and Co lattice. The following lattice plane relationships have been proposed: $(002)_{Cr}//(11\bar{2}0)_{Co}$, $(110)_{Cr}//(10\bar{1}1)_{Co}$, $(110)_{Cr}//(10\bar{1}0)_{Co}$, and $(211)_{Cr}//(10\bar{1}0)_{Co}$. Generally, the addition of alloying elements into cobalt expands the lattice. For an alloy composition of $CoCr_{10}Pt_{18}$ for example, the lattice parameters are calculated to be $c_o$=4.148 Å, $a_o$=2.556 Å. For this composition, the lattice mismatch for pure Cr and $CoCr_{10}Pt_{18}$ alloy for several combination of planes are listed in Table 1. The two mismatch numbers are two orthogonal directions in the plane of the epitaxy. It can be seen from table 1 that best epitaxial match can be obtained between $(110)_{Cr}$ and $(10\bar{1}1)_{Co}$ for a lattice mismatch of 0.2% and 2% respectively. However, in this case the c-axis of the cobalt is tilted 28° out of the plane. Another closely matched relationship is $(211)_{Cr}$ and $(10\bar{1}0)_{Co}$ for a lattice mismatch of 1.7% and 2% respectively. For other epitaxial relationships where the c-axis lies in the plane of the film, the difference in mismatch along the two directions is always greater.

Since the original work by J. Daval & D. Randet on Co/Cr epitaxial film structure, there are many examples of work on both the cobalt and chromium underlayer alloys to improve the recording performance of the cobalt/chromium alloy structure. A variety of schemes have been proposed to improve the lattice matching between Cr or Cr alloys with the cobalt alloy, and hence improve the in-plane orientation of the cobalt, and improve Hc and other properties as previously noted. There are several approaches. The first involves alloy or deposition variations on a basic two layer structure, involving Cr and Co alloy films. The second approach involves use of multiple layers in the undercoat or a different material other than Cr or alloys of Cr in an attempt to affect the magnetic properties. Thirdly, multiple magnetic layers can be used to attempt a better in-plane orientation.

For a basic two layer approach, in an article by Deng et al. entitled "Magnetic Properties and Crystal Texture of Co Alloy Thin Films Prepared on Double Bias Cr," Journal of Applied Physics 73(10) 15 May (1993) p. 6677–79, the authors claim that $(200)_{Cr}$ orientation can be formed on single crystal Si substrates which then allow $(11\bar{2}0)_{Co}$ orientation to form on the $(200)_{Cr}$ at room temperature. This is useful in terms of obtaining the good in-plane orientation of the Co, but the Si substrate is considerably expensive compared to conventional NiP/Aluminum substrates or alternative substrates such as glass or glass-ceramic, and therefore it is not practical. The authors also note that with substrate bias, Cr forms a strong (110) orientation, which then causes the cobalt alloy film to form with $(10\bar{1}1)_{Co}$ texture which is out of the plane and hence the Hc of the film dropped. Therefore the cobalt alloy film has a natural tendency to form with the out of plane $(10\bar{1}1)_{Co}$ orientation on $(110)_{Cr}$. The Cr thickness was 1000 Å and Hc was $\leq 2000$ Oe for a CoCrTa film thickness of 300 Å. In another paper entitled "Preferred Orientation in Cr-and Co-Based Thin Films and its Effect on the Read/Write Performance of the Media" by H-C Tsai et al. in Journal of Applied Physics 71(7), 1 April (1992) p. 3579–85, the authors discuss the importance of achieving $(200)_{Cr}$ which then promotes the in-plane orientation of $(11\bar{2}0)_{Co}$ for higher Hc and improved parametric performance. On glass ceramic substrates (canasite) however, the authors note that $(110)_{Cr}$ is formed which then causes the Co-alloy to grow with the c-axis out of the plane. In fact a vertical orientation in which the c-axis is normal to the film plane was reported in one case. The authors report that formation of preferred orientation in the Cr layer is determined by substrate material and the oxygen content in the sputtered film. For the in-plane media, a Hc of 1350 Oe was obtained for CoCrTa alloy, and 1370–1830 Oe was obtained for CoCrPtTa alloy. Typical Cr thickness in these films were ~1700 Å, and MrT of the media was also high at around 5 memu/cm$^2$.

Using the second approach, in U.S. Pat. No. 4,652,499 by K. Howard, it is disclosed that to improve the lattice matching between the Co-alloy and the Cr underlayer for better epitaxy, the Cr underlayer is alloyed with Vanadium (V). Other alloying additions such as Ti, Mo, Hf and Ta have been also tried. According to each of these methods, the Cr underlayer must be several hundred angstroms thick to establish the proper Cr texture for epitaxial growth of the Co-alloy. However, the consequence of forming such a thick Cr or Cr alloy layer is that the grain size of the Cr or Cr alloy also grows, to a size of several hundreds or possibly thousands of angstroms in diameter. Since the grain size of the Co-alloy deposited on the Cr underlayer will match the grain size of the Cr underlayer, the resulting epitaxially grown Co-alloy will also have a grain size of several hundreds to possibly thousands of angstroms in diameter. In such a case, the high intrinsic media noise at the magnetic transitions due to the large grains renders the media useless for current and future high density recording.

In an approach using multiple underlayer and different materials, Lee et al. (Carnegie Mellon) in "NiAl Underlayers for CoCrTa Magnetic Thin Films," IEEE Transactions on Magnetics, vol. 30, no. 6, pp. 3951–3 (Nov. 1994); "Effects of Cr Intermediate Layers on CoCrPt Thin Film Media on NiAl Underlayers," IEEE Transactions on Magnetics, vol. 31, no. 6, pp. 2728–30 (Nov. 1995); and European Patent Application Publication EP 0 704 839 A1, claiming priority from a U.S. patent application Ser. No. 08/315,096, filed Sep. 29, 1994, now U.S. Pat. No. 5,693,426 teach a Co based magnetic alloy layer formed above an underlayer having a B-2 crystal structure. The B-2 crystal is a body centered cubic structure alloy such as NiAl. In one embodiment, the Co based magnetic alloy layer is grown epitaxially on the B-2 structure layers directly below. The proposed rationale is that $(110)_{NiAl}$ and $(112)_{NiAl}$ preferred growth orientation of the NiAl layer provides the basis for the Co-alloy to assume a $(10\bar{1}0)_{Co}$ orientation, resulting in an in-plane c-axis orientation of the cobalt alloy, and hence resulting in high Hc.

In another embodiment, an extremely thin Cr intermediate layer (25 to 50 Å) is deposited between a B-2 NiAl underlayer and the Co based magnetic alloy layer, in order to increase Hc of the CoCrPt alloy. In this case, the Cr layer is grown epitaxially on the B-2 crystal underlayer, and the Co based magnetic alloy is grown epitaxially on the thin Cr layer. While the Cr layer is necessary for increased coercivity and squareness, the Cr layer cannot interrupt the crystallographic relationship between the $(112)_{NiAl}$ and the $(10\bar{1}0)_{Co}$ (i.e., the indirect epitaxy between the B2 layer and the magnetic recording material layer). Thus, Lee et al. require that the intermediate layer be extremely thin (between 25 Å and 50 Å) to prevent the Cr from developing its own preferred orientation. Lee et al. also state that a Cr intermediate layer is required to prevent contamination of the Co by the excess Al on the NiAl film surface, and that the Cr intermediate layer must be sufficiently thin to (a) minimize diffusion of Cr into the Co film layer, and (b) avoid interference with the epitaxy between the Co alloy magnetic recording layer and the NiAl underlayer. In their examples, relatively high coercivity up to 3300 Oe and squareness (S*) of >90% are reported for the high Pt content of 18 atomic % alloy.

Despite the high coercivity, high squareness, and fine grain structure taught by Lee et al. (see EPO 704 839 A1), the mere addition of the NiAl underlayer provides only a minimal improvement in the media noise performance, and thus the resulting media is inadequate for current and future high density recording applications. With reference to EPO 704 839 A1, this minimal improvement can be seen in FIGS. 14 and 15 showing carrier noise measurement data, and FIGS. 16 and 17 showing integrated media noise measurement data. Importantly, it appears that the media taught by Lee et al. suffers from high intergranular exchange interaction as evidenced by the high hysteresis loop squareness S* of larger than 90% shown in the above-referenced paper in IEEE Transactions on Magnetics, V.31, p. 2728, (1995). There is no teaching by Lee et al. to address the issue of reducing the noise. In addition, a very thick layer of NiAl of over 1000 Å is required in order to form the necessary $(112)_{NiAl}$ texture. Such thick layer is expensive to manufacture. Thick layers cause the deposition shields around the cathodes to flake early, necessitating frequent shut-downs for clean-up. Flaking parts also cause defects which is detrimental to the performance of the media. NiAl is also a difficult material to make the sputtering target out of, hence it is expensive to make. Also the use of thick layers necessitates the use of high rate sputtering methods such as using DC magnetron sputtering. A high rate can be used to deposit thick films but the machine must be cleaned frequently since the inside of the deposition chamber becomes coated just as fast as the substrates. If slower deposition method such as RF sputtering is used, the time allowed for each sample must be increased hence the throughput of the machine will be decreased. In either case, the cost of depositing a thick layer makes it impractical and costly for commercial use.

There are several other problems with the NiAl underlayer concept. As it was shown previously in Table 1, a $(110)_{NiAl}$ texture is like the $(110)_{Cr}$ in that it is also likely to cause the growth of $(10\bar{1}1)_{Co}$ texture, since the lattice match is equally favorable. Since $(10\bar{1}1)_{Co}$ texture has c-axis oriented 28° out of the plane, it is not a favorable orientation for good parametric performance. Therefore it is quite possible that under some more varied deposition or substrate conditions that can occur in a typical manufacturing environment, the perfect in-plane orientation of the cobalt alloy layer may not occur. We also believe that the high coercivity taught by Lee et al. results from the use of a relatively large amount of platinum (e.g., ~18 atomic per cent to obtain Hc of 3300 Oe), as opposed to being derived exclusively from the c-axis in-plane orientation of the cobalt and perfection of the crystallite lattice. As will be discussed further below, a properly isolated CoPt based film can achieve a coercivity of over 3,000 Oe, even with less than 13 atomic % Pt in the alloy even without the benefit of Cr epitaxy, (that is without c-axis in the plane of the film) if the grains in the film are properly isolated as we have shown in the patent application by Chen et al., Ser. No. 08/802,646, now U.S. Pat. No. 5,846,648 which application is assigned to the assignee of the present invention, and which application is hereby incorporated by reference herein. Indeed, such a high coercivity may be produced with random orientation of grains. The fact that an Hc even higher than 3300 Oe was not obtained by Lee et al. with 18 atomic % Pt in the alloy together with the fact that they obtained extremely high hysteresis loop squareness and no improvement in noise performance indicate that the film taught by Lee et al. has significant intergranular exchange interaction between the physical grains.

The third approach to improving in-plane orientation of the cobalt alloy film is the dual magnetic layer approach as taught in many publications as cited below. In a laid-open Japanese patent application JP8-147660 by Yan and Okumura, a double layer of CoCrTa/CoCrPt on Cr has improved recording density and lowered noise. In one example, the total magnetic layer thickness is 200 Å with thin CoCrPt top layer thickness between 20–60 Å. Cr thickness was 700 Å, and Pt concentration in CoCrPt alloy was between 10–15 atomic %. With CoCrTa:CoCrPt ratio of 150 Å:50 Å (i.e. 3:1), a maximum Hc of 2150 Oe was achieved.

In another laid-open Japanese patent application JP5-120663 by Yamaguchi and Onodera (Fuji Electric), a dual magnetic layer consisting of a CoCrTa first layer and a CoCrPt second layer having low noise and high Hc is described. In this case, the thickness ratio of CoCrTa:CoCrPt between 1:9 to 7:3 is specified, with optimum around 3:7 to 5:5 (half) achieving the combination of high Hc with low noise. For a total thickness of the film at 500 Å, the CoCrTa layer is from 50 Å (1/9) to 250 Å (5/5). The maximum Hc obtained was 1900 Oe with a top layer alloy composition of $Co_{82}Cr_{14}Pt_4$ with a 1000 Å Cr underlayer. The MrT of the media was ~3.6 memu/cm². The inventors also stipulate that in the preferred embodiment, the CoCrTa film must be sputtered within 15 seconds after the Cr layer is deposited, and CoCrPt is to be sputtered within 10 seconds after the deposition of CoCrTa film. This is to maintain the high Hc of the film and prevent contamination of the film once it has been sputtered.

In a Japanese laid-open publication JP5-109043 by Inao, Utsumi and Kondoh, the order of the magnetic alloy film stack is now reversed, where the first layer above the Cr is CoCrPt followed by CoCrTa alloy. The first layer is 100 to 1000 Å thick with preferred thickness of 100 to 800 Å. For the second layer, the thickness is 100 to 1000 Å with a preferred layer thickness of 150 to 700 Å. They claim that it is preferable to have CoCrPt as the bottom layer with its high Hc capability and the low noise CoCrTa film on top for the best performance. In their preferred embodiment, they obtain maximum Hc of about 1700 Oe with 10 atomic % Pt for Cr(3000 Å)/CoPt$_{10}$ (300 Å)/CoCr$_{12}$Ta$_4$ (400 Å) structure. The Hc they achieve is actually very low for the Pt content that they use, indicating that less than ideal Ku has been achieved in their media. No mention is made of the orientation of the magnetic media.

In an article titled "Recording Characteristics of CoCrTa, CoCrPt Double Layer" by Yamaguchi et al. in 15th Annual Japanese Applied Magnetic Conference (1991), the authors also describe a magnetic double layer consisting of 150 Å thick CoCrTa alloy as the first layer above the Cr, followed by 350 Å thick CoCrPt layer as having good resolution, SNR and OW. Films are sputtered by DC magnetron method to achieve Hc of 1200–1900 Oe. Alloy compositions are not specified. In an accompanying article by Kodama et al. in the same journal entitled "Magnetic properties of CoCrTa, CoCrPt Double Layers", the authors show that for 500 Å total film thickness, there is a smooth transition in Hc from the lower value of 1000 Oe for 100% CoCrTa to higher Hc value of about 2100 Oe for 100% CoCrPt as the ratio of thickness of the two alloy films are changed. Yamaguchi et al. show that for CoCrTa=150 Å and CoCrPt=350 Å, superior SNR, OW and PW$_{50}$ are obtained over those of a single layer CoCrPt film.

More recently, a paper by P. Glijer et al. (Univ. of Minnesota) entitled "Advanced Multilayer Thin Films for Ultra-High Density Magnetic Recording Media" published in IEEE Transaction on Magnetics, Vol. 30, No 6, (1994), describe the properties of CoCrTa/CoCrPt double layer with the thickness ratio of 50 Å:200 Å. It is claimed that CoCr$_{16}$Ta$_{2.5}$ alloy has better lattice match with a Cr underlayer than with CoCr$_{13}$Pt$_{13}$ hence leading to better in-plane c-axis orientation of the cobalt alloy magnetic layer. The epitaxial relationship was quoted to be $\{10\bar{1}0\}_{Co}$ matched to $\{110\}_{Cr}$ and $\{112\}_{Cr}$. A Very high Hc of 3720 Oe was obtained for MrT of 0.9 memu/cm², with a good S* ratio of 0.88. Media noise was expected to be higher for this structure however, due to increased intergranular exchange present in the media.

A paper by L. L. Fang et al. entitled "New High Coercivity Cobalt Alloy Thin Film Medium Structure for Longitudinal Recording" published in Applied Physics Letters, 65 (24) Dec., 12 (1994) also describes a double layer magnetic structure using CoCr$_{13}$Ta$_3$ and CoCr$_{10}$Pt$_{18}$. In this work, the Cr layer is 1000 Å and a range of thickness rations of CoCrTa and CoCrPt is explored. For a total double layer thickness of 300 or 400 Å, the Hc peaks at around 4000 Oe for 50 to 60 Å thick intermediate CoCrTa layer. The orientation relationship is reported as $(110)_{Cr}$ matched to (10

$\overline{1}1)_{Co}$. Even though this implies out of plane c-axis orientation of the cobalt alloy, the hysteresis loop squareness is very high. Whereas without the CoCrTa intermediate layer, the magnetic layer shows vertical orientation, as indicated by x-ray diffraction and hysteresis loop. The high Hc obtained by Fang et al. is quite likely due to the high Pt content in the magnetic layer, and the fact that high squareness was obtained despite the out of plane c-axis orientation suggests that media has high exchange coupling.

A paper by B. Zhang et al. entitled "CoCrTa/CoCrPtTa Double-Layer Films for Magnetic Recording" published in IEEE Transactions on Magnetics Vol. 32 No. 5 p. 3590 (1996) also describes recording and magnetic properties of various combinations of double layer structures. In this work, the ratio between CoCrTa and CoCrPtTa layers are varied as in Glijer's work. When the bottom CoCrTa layer is ⅓ of the total thickness and balance of ⅔ made up of CoCrPtTa, the Hc peaks at around 2500 Oe which is higher than the Hc of each alloy by itself. SNR however decreased monotonically with increasing CoCrPtTa thickness. The hysteresis loop of the double layer film shows a more square loop compared to the single layer films. When the film stacking order was reversed with CoCrPtTa as the bottom layer however, the results were completely different. The SNR remained low for the most part, inheriting the poor SNR of the CoCrPtTa layer, while Hc increased monotonically with CoCrPtTa thickness and never peaking as it did in the reverse stacking. It is claimed that the CoCrTa alloy has the right grain structure, namely smaller and more uniform grain size which can be passed on to CoCrPtTa when it is deposited first above the Cr underlayer. From their results, a thickness in the range of ~60 Å is required in order to set the proper microstructure of CoCrTa in place for the subsequent proper growth of CoCrPtTa layer. They do not state the orientation relationship in their film, but they show x-ray diffraction data showing a strong presence of $(110)_{Cr}$ along with $(10\overline{1}1)_{Co}$ and $(10\overline{1}0)_{Co}$ orientations. Alloy compositions are not stated, nor are the deposition conditions in this publication.

Lastly, in an published abstract #CC-09 by J. Zou et al. (Carnegie Mellon) for the Joint MMM-Intermag Conference to be held January, 1998, the authors claim that by interspersing CoCrTa between the $(112)_{NiAl}$ plane and CoCrPt magnetic layer, the $(10\overline{1}0)_{Co}$ texture improves and in-plane Hc also increases. $(10\overline{1}0)_{Co}$ in CoCrTa is claimed to have better lattice match to the $(112)_{NiAl}$ than CoCrPt. Therefore interspersing a very thin layer of CoCrTa is claimed to cause better in-plane orientation of the CoCrPt film, hence contributing to the high Hc and hysteresis loop squareness.

In all of the aforementioned publications, a common theme is that lattice matching between Co alloy and Cr is claimed as the key contributor to the high Hc and lower noise. Particularly with respect to double layers using CoCrTa first layer and CoCrPt second layer, it is claimed that CoCrTa is better lattice matched to Cr, whether the orientation relationship claimed is $(200)_{Cr}//(11\overline{2}0)_{Co}$, $(110)_{Cr}//(10\overline{1}0)_{Co}$ or sometimes even $(110)_{Cr}//(10\overline{1}1)_{Co}$. However, as shown earlier in table 1, a perfect lattice match in all directions is not possible. Furthermore, perfect or even good epitaxy in an actual production machines is also difficult to achieve. One reason is that residual gases in the system which are often water vapor and oxygen which can be produced from the water vapor, can affect the interface between the Cr and the Co alloy layer and cause loss or partial loss of epitaxy.

From our experience in this work, most of the deposition processes reported in the references cited in this application can be considered "high-rate". Typically rates above approximately 5 Å/sec fall in the high rate category. Although some of the prior art discloses lower deposition rates, such processes are typically used only in research settings, where there is little or no emphasis on throughput. In contrast, it is generally considered desirable to use high rate processes to achieve high throughput in a production environment to make the process commercially viable. For example, in many production level machines, rates as high as 50 Å/sec are typically used in order to maintain high throughput.

One alternative to reducing the effect of residual gases on epitaxy is to improve the vacuum of the deposition chamber. M. Takahashi et al. in "The Ultra Clean Sputtering Process and High Density Magnetic Recording Media" published in IEEE Transactions on Magnetics Vol. 33, No. 5 p. 2938 (1997) shows that by maintaining the vacuum at an ultra high vacuum level of about $10^{-9}$ Torr, higher Hc is obtained at a thinner Cr thickness. It is claimed that high Hc is obtained through increase in the magnetocrystalline anisotropy field $H_k^{grain}$, and by a decrease in the degree of intergranular magnetic coupling. The high vacuum allows better segregation of Cr at the grain boundary, and formation of smaller magnetic grains through smaller Cr underlayer grains. These effects also in turn improved the S/N ratio of the media. It can also be inferred that in-plane orientation of the media is improved by reducing the oxidation of Cr underlayer. Although the results are impressive, the type of vacuum levels which are advocated are not practical in terms of a low cost, high throughput manufacturing operation.

Therefore, under deposition conditions that are not entirely perfect in terms of vacuum conditions and at high rate of deposition typically used in a commercial application, obtaining good epitaxy between Cr and Co-alloy layer is difficult to achieve. Hence c-axis in-plane orientation of the hexagonal cobalt film is not necessarily achieved, leading to lower Hc than is possible for a given Pt content of CoCrPt based alloy, and also reduced squareness. In addition, the grain size may not be uniform and grain themselves may not have the proper crystalline perfection for high anisotropy constant $K_u$. These factors lead to films having less than desirable parametric performance. As it was shown earlier, even under best conditions where epitaxy is favored, there is still inherent mismatch between hexagonal cobalt and cubic chrome lattice. Lack of good epitaxy and subsequent poor growth of the magnetic layer can result in formation of a large amount of imperfections such as dislocations, stacking faults and other irregularities in the crystalline structure which will reduce Hc potential for given alloy composition and Pt content. If the magnetic crystallites contain a high amount of imperfections, the $K_u$ of the media will be decreased drastically. When the CoCrTa layer is inserted between the CoCrPt based alloy and Cr according to the above cited prior art, it apparently helps the perfection of the CoCrPt based alloy to some extent, but the cited literature still has to resort to high Pt containing alloy to raise the Hc. High platinum costs more, reduces the magnetization Ms of the film and hence requires a thicker film to obtain a given MrT, and also causes more lattice imperfections in the cobalt HCP structure. At above 8% platinum content, there is increased chance of producing FCC (face-centered cubic) crystal structure which will reduce the Ku value of the HCP structure by more than an order of magnitude. Hence adding an excessive amount of Pt in an attempt to raise Hc will defeat the purpose of the benefit of Pt. Because of these difficulties, we have through careful research invented a new and unique method of overcoming the aforementioned difficulties as follows:

In this invention, a thin layer of a Co alloy such as a CoCr based alloy, including an alloy having the same composition used for the main magnetic layer, is sputtered at an extremely low deposition rate of preferably <1.0 Å/second to a thickness of preferably less than 20 Å on a {200} oriented Cr film under moderate substrate temperatures, followed by high rate deposition of CoCrPt based alloy to create a media which has very high Hc, low $PW_{50}$, high SNR and low TNLD values. By using this technique, the CoCrPt based alloy layer achieves excellent in-plane crystallographic orientation, and high Hc is achieved with a minimal amount of Pt. The combination of low Pt, high rate deposition of the main magnetic layer and relative insensitivity of the process to the vacuum conditions of the system makes the method very commercially viable. There are also several additional key benefit which the previous literature have failed to achieve. They are as follows: First, the method allows very fine grain structure of cobalt to be formed which contributes to good signal to noise ratio. Second, the fine grain structure combined with chromium segregation between the grains improve the signal to noise ratio even higher. Third, a high degree of in-plane c-axis orientation is achieved in the cobalt layer which provides very high squareness media which in turn helps to improve OW and obtain low TNLD. Fourth, the quality of the grains is high so that high anisotropy constant $K_u$, is obtained in the magnetic layer, resulting in high Hc without the necessity of addition of excessively high level of Pt. Low TNLD also results from the high perfection of the grains. These results are obtained using very conventional sputtering processes, without having to invoke ultra high vacuum conditions. Also there is apparently little impact of specific % lattice mismatch between the Cr underlayer and the CoCrPt based alloy in order to obtain high Hc and good recording performance as long as there is a $(200)_{Cr}$ orientation in the Cr to allow some matching with the subsequently deposited cobalt alloy film. Similar results can be obtained for different Cr alloy layers, such as CrV films. There is much more flexibility now to choose the alloy composition based on the ability of the alloy to affect such parameters as ability to segregate, or to form small grain sizes as opposed to adjusting the magnetic and underlayer compositions to adjust for lattice matching between the two as proposed conventionally.

SUMMARY OF THE INVENTION

The present invention consists of magnetic thin film media with the structure of chromium or chromium alloy underlayer, followed by an ultra-thin nucleation layer consisting of CoCr based alloy deposited at slow deposition rate with sufficient atomic mobility conditions, such as with substrate heating or in combination with DC bias on the substrate, followed by full deposition of CoCrPt based magnetic alloy at high deposition rate which is the primary layer for the recording. First, a Cr or Cr alloy film is sputtered using preferably RF diode or RF magnetron cathodes, with heating up to around 250° C. or lower at a base pressure of $1 \times 10^{-6}$ Torr or better. A conventional deposition rate of between 5 to 50 Å/sec is first used to deposit Cr layer to obtain preferably a $(200)_{Cr}$ orientation. The Cr thickness is typically 300 Å or less. The second layer which is a nucleation layer consisting of preferably a CoCr based alloy such as CoCrTa is deposited at a very low deposition rate, and it is designed to form a small-grained template for the subsequent growth of the CoCrPt based alloy magnetic layer. An important discovery is that the nucleation layer is very thin, at preferably less than approximately 20 Å thick, and that it should preferably be deposited at a very slow rate of less than approximately 1.0 Å/sec. In addition, sufficient mobility is preferably imparted to the slowly depositing atoms. This can be achieved by various means including applying substrate heating, substrate DC bias, and using an RF sputter deposition process. The RF process allows for low sputter rate and also induces high mobility to the sputter species from the high bombardment of substrate with electrons.

Alternatively, instead of RF diode sputtering, DC magnetron sputtering can be used, particularly in the high rate deposition of Cr underlayer and the top magnetic layer. For the nucleation layer, DC magnetron can be used for low rate deposition, but it will be more difficult to obtain low rates compared to the RF deposition method. If DC magnetron sputtering is used, additional means of providing high mobility to the sputtering species are desirable, such as a higher level of substrate heating and/or higher DC substrate bias.

By forming the ultra-thin CoCr based alloy nucleation layer by the above method, the magnetic properties of CoCrPt based alloy film such as CoCrTaPt sputtered at high deposition rate above the nucleation changes drastically over the case where the nucleation layer does not exist. The Hc is dramatically raised and hysteresis loop squareness increases. This media will typically exhibit coercivity squareness and remanent coercivity squareness of 0.8 or better and a switching field distribution approaching 0.2 or less. At the same time, the intrinsic media noise is reduced substantially, and resolution is enhanced. TNLD and OW values are also improved over the performance of a non-epitaxial three-dimensional isotropic film. The media is ideally suited for current and future high storage density applications, such as use with magneto-resistive (MR) heads and future giant MR head.

An important aspect of our invention is to overcome the imperfect lattice matching between Cr or Cr alloy underlayer and the magnetic layer by introducing a very good lattice matching of a nucleation layer to the magnetic layer. At low deposition rates with high enough atomic mobility of the nucleation layer, a near equilibrium growth condition is obtained so that a near perfect HCP crystal structure of the nucleation layer is obtained. The thin nucleation layer then serves as a template for the high rate deposition of magnetic layer. Since the main magnetic layer has the same crystal structure as, and is very closely lattice matched to the nucleation layer, there is a high likelihood of good epitaxy between these two layers, hence leading to in-plane orientation of the c-axis and more perfect crystal lattice structure of the cobalt alloy grains. Achieving an equilibrium or near equilibrium condition during the initial growth of the nucleation layer on the Cr or Cr alloy underlayer appears to be very critical to achieving good epitaxy between the nucleation layer and the Cr underlayer. The Cr or Cr alloy underlayer has cubic BCC structure on which the hexagonal HCP structure of the cobalt alloy film must grow. The two lattices do not match very well, and near equilibrium conditions with high mobility of the depositing species will favor better epitaxy. The surface of the Cr or Cr alloy film is also very sensitive to vacuum. It can be easily contaminated or oxidized so that even if proper crystallographic orientation of the Cr layer has been deposited, the subsequent magnetic layer may not grow epitaxially above it. In fact, the cobalt alloy film generally does not favor growth with the c-axis in the plane of the film. The $(0002)_{Co}$ growth (perpendicular orientation) is much more favored, especially at a high deposition rate, so that any problem in epitaxy between a depositing Co alloy film and a Cr underlayer will cause perpendicular orientation to form. Near-equilibrium, slow-rate deposition overcomes this tendency for perpendicular orientation in the cobalt alloy film, and also allows time for the depositing atoms to "find" the correct epitaxy for in-plane c-axis orientation. Near equilibrium growth state can also expel the impurity atoms such as oxygen and other residual gas from the surface.

Once a CoCr based alloy nucleation layer is formed, the surface is more favorable for subsequent deposition of the magnetic layer, even at moderate vacuum conditions so that subsequent to its deposition, the magnetic layer film can be deposited at a higher rate and achieve good in-plane orientation as long as it has close lattice matching with the nucleation layer. It was discovered that this can occur even when the nucleation layer film thickness is only few angstroms thick. Therefore the process is well-suited for use in production equipment where the vacuum levels are usually poorer compared to machines typically used in research. In using a typical production deposition tool for making the recording media, a high rate deposition is necessary in order to make the process economical. But in so doing, thermodynamic equilibrium is difficult to achieve and good epitaxy is often compromised. By splitting the magnetic layer process into two parts, namely a thin and slow deposition rate layer and thicker high rate deposition layer, high throughput is still maintained. Therefore the structure and the method of deposition of the layers are well-suited for production deposition process.

In previous art using much thicker films of CoCrTa as an intermediate layer between Cr and CoCrPt, it is claimed that better lattice match between Cr and CoCrTa alloy as opposed to Cr with CoCrPt is the key contributor to obtaining high Hc and in-plane c-axis orientation. In this invention, there is no limitation to CoCrTa as the alloy of choice for nucleation layer. Since it is the slow deposition rate with high mobility which determines the quality of the epitaxy between the Cr underlayer and the nucleation layer, there is more freedom in the alloy selection for the nucleation layer. In fact, the most ideal choice would be that the same alloy composition is used for both the nucleation layer as well as for the magnetic layer. In practice, a small modification from the magnetic alloy can be used for the nucleation layer composition. For example, for a $CoCr_{15}Ta_4Pt_3$ magnetic layer, $CoCr_{15}Ta_4$ without the Pt can be used as the nucleation layer to save the cost of the Pt, but the lattice constant of the two alloys are very close to each other (e.g., within 0.5% lattice mismatch). For higher Pt content magnetic alloy, the nucleation layer may require additional Pt so as to maintain a lattice constant that is closer to that of the magnetic layer. It is quite important that there is a close lattice match between the nucleation layer and the magnetic layer in this invention in order to obtain good epitaxy and also to obtain a high quality crystalline film in the magnetic layer for high Ku values. However, since the crystal structure will be the same hexagonal structure between the nucleation layer and magnetic layer, there is actually more flexibility in the choice of alloys for the two layers. Therefore the alloy selection can be based more on factors such as ability to form small and uniform grains or on basis of creating segregated grains as opposed to selection based on lattice matching considerations alone as is the case with previous art. See the earlier referenced patent application of Chen et al., Ser. No. 08/802,646, now U.S. Pat. No. 5,846,648 for a description of some methods of achieving small and uniform grains and for creating segregated grains.

Control of grain growth and structure is also a key benefit of the present invention. Media according to the present invention comprise a magnetic recording layer having fine individual magnetic grains having a diameter of 100 Å or less which are isolated from one another by a solid segregant such as excess Cr in CoCrPt base alloy. The magnetic grains have a uniform size, and spacing on the order of about 10 Å. Importantly, the grains of the magnetic recording layer are principally single crystals with minimum defects in the grains, such as dislocations and stacking faults throughout the thickness of the layer, so as to maximize the magnetocrystalline anisotropy constant, Ku, of each individual grain, and furthermore, the c-axis of the grains are oriented predominantly in the plane of the film and are randomly oriented in the plane to provide high Hc. Such magnetic grain structure is a consequence of the use of thin nucleation layer formed in slow rate deposition under near equilibrium condition and high atomic mobility. Since the main magnetic layer grains grows epitaxially over the nucleation layer grains, controlling the size of each nucleation site (grains) and the spacing between adjacent nucleation sites will provide an easy means for controlling the grain growth characteristics, size and spacing of the magnetic recording layer, as well as providing large angle grain boundaries. In addition, proper control of the size and spacing of the nucleation layer grains provides a method for optimizing the segregation of segregant material such as Cr at the grain boundaries in the magnetic recording layer.

The consequence of having the microstructure as described above on the magnetic properties of the media are as follows. Smaller grains contribute to lower intrinsic noise in the recording media. More crystalline perfection in the grains provide the highest possible $K_u$ so that high Hc is obtained for a given Pt concentration in the alloy. Uniform and small grains also contribute to improving the OW. TNLD is improved by having the c-axis in the plane of the film. High hysteresis loop squareness is obtained with having uniformly isolated grains, with uniform size distribution.

Lastly, the process used herein is highly economical and reproducible. With even a relatively low platinum content of around 3 atomic %, an Hc value of about 3000 Oe has been obtained at the MrT value of 0.7–0.8 memu/cm². This is in contrast with the very high Pt content used by others to obtain high Hc in the literature we have cited. Reducing the Pt content in the sputtering target will reduce the cost of producing the disk significantly, and increase the Ms of the film. This means that film thickness itself can be reduced for a given MrT product, which results in better performance through effectively lower head-media spacing.

BRIEF DESCRIPTION OF THE DRAWINGS

The present invention will be described in greater detail below, including specific examples thereof, with regard to the Figures, in which:

FIG. 1 is a crystallographic representation of cobalt with some of the planes and directions indicated.

FIG. 2 is a crystallographic representation of chromium with some of the planes and directions indicated.

FIG. 3 is a illustration of lattice matching between $(200)_{Cr}$ plane and $(11\bar{2}0)_{Co}$ plane.

FIG. 4 is a cross section of a rigid thin-film magnetic disk constructed in accordance with the present invention.

FIG. 5 is a plot of Hc vs. $CoCr_{16}Ta_4$ nucleation layer cathode power density for 195 Å thick $CrV_{50}$ undercoat and 230 Å thick $CoCr_{15}Ta_5Pt_5$ magnetic layer.

FIG. 6 is a in-plane hysteresis loop of a CrV/CoCrTaPt film from FIG. 5 without the nucleation layer.

FIG. 7 is a vertical hysteresis loop of a CrV/CoCrTaPt film from FIG. 5 without the nucleation layer.

FIG. 8 is a in-plane hysteresis loop of a CrV/CoCrTa/CoCrTaPt film with CoCrTa nucleation layer cathode power density of 0.54 watts/cm$^2$ (−600 volts RF cathode bias) from FIG. 5.

FIG. 9 is a vertical hysteresis loop of a CrV/CoCrTa/CoCrTaPt with CoCrTa nucleation layer cathode power density of 0.54 watts/cm$^2$ (−600 volts RF cathode bias) from FIG. 5.

FIG. 10 is a plot of MrT vs. CoCrTa nucleation layer cathode power density for CrV underlayer thickness of 195 Å.

FIG. 11 is a plot of Hc vs. CrV cathode power density for CoCrTa nucleation layer cathode power density of 0.54 watts/cm$^2$ (−600 volts RF cathode bias).

FIG. 12 is a plot of Hc vs. CoCr$_{16}$Ta$_4$ nucleation layer cathode power density for Cr undercoat thickness of 230 Å and CoCr$_{15}$Ta$_5$Pt$_3$ magnetic layer thickness fixed at approximately 230 Å.

FIG. 13 is a plot of Hc vs. CoCrTa nucleation layer cathode power density for three different conditions of substrate DC bias on the CoCrTa nucleation layer and CoCrTaPt magnetic layer.

FIG. 14 is a in-plane hysteresis loop of a Cr/CoCrTaPt film without the nucleation layer from curve C in FIG. 13.

FIG. 15 is a vertical hysteresis loop of a Cr/CoCrTaPt film without the nucleation layer from curve C in FIG. 13.

FIG. 16 is a in-plane hysteresis loop of a Cr/CoCrTa/CoCrTaPt film with the CoCrTa nucleation layer deposited at a cathode power density of 0.3 watts/cm$^2$ (−400 volts RF cathode bias) and substrate DC bias of −35 volts applied on both CoCrTa and CoCrTaPt layer from curve C in FIG. 13.

FIG. 17 is a vertical hysteresis loop of a Cr/CoCrTa/CoCrTaPt film with the CoCrTa nucleation layer deposited at a cathode power density of 0.3 watts/cm$^2$ (−400 volts RF cathode bias) from curve C in FIG. 13.

FIG. 18 is a cross-section TEM micrograph showing the thickness and structure of CoCr$_{16}$Ta$_4$ nucleation layer deposited at cathode power density of 0.54 watts/cm$^2$ (−600 volts RF cathode bias) as in FIG. 5 and FIG. 12.

DETAILED DESCRIPTION

FIG. 4 is a cross section (not to scale) of a typical rigid thin-film magnetic disk (10) constructed in accordance with the present invention. A general description of the complete disk (10) will be presented below, followed by a detailed description of certain of the layers thereof and the methods and conditions for their deposition. Finally, a detailed description of several examples will be presented to highlight various of the important aspects of the present invention.

Disk (10) consists of an aluminum alloy substrate (11). Substrate (11) may be an aluminum blank onto which a plated NiP layer (not shown) is formed by electroless plating or other methods well known in the art. Alternatively, substrate (11) may be glass, ceramic, glass-ceramic, carbon based materials, silicon, titanium, stainless steel, or other appropriate material selected for reasons beyond the scope of this invention. The uppermost surface of substrate (11) (from the perspective of FIG. 4) is smooth and well-cleaned. Optionally, the surface may be textured to improve the CSS performance of the resulting magnetic storage medium, as is well known in the art.

A Cr or Cr alloy underlayer (12), described in further detail below, is then deposited onto substrate (11). Above the Cr underlayer, a very thin nucleation layer (13) of a Co alloy such as a CoCr based alloy (which may be the same alloy composition as the magnetic layer such as CoCrPt or CoCrTaPt) film is deposited at a very slow rate as will be described later. Sputtering is the preferred method of depositing any of the embodiments of the layer 13, although other methods of deposition may accomplish the desired goal of forming one or more of these sublayers. In particular, RF diode sputtering is the preferred method.

Returning to FIG. 4, a magnetic recording layer (14) comprising a magnetic alloy consisting of CoCrPt or CoCrPtTa based alloy is deposited above the CoCr based alloy nucleation layer (13). Again, sputtering is a preferred method for deposition of this layer, although other techniques are available to accomplish the goal of deposition of this layer. A protective over layer (15) of a type known in the art, e.g., of carbon or carbon doped with nitrogen, hydrogen or both, or oxides such as ZrO$_2$, SiO$_2$, etc., or nitrides such as TiN, ZrN, etc., or carbides such as TiC, SiC, etc., of a thickness for example less than 200 Å, and a lubricant layer (16) such as perfluoropolyether of a type known in the art, are applied over the protective layer (15). Details of the protective over layer (15) and lubricant layer (16) are beyond the scope of the present invention, and therefore are not discussed in detail herein.

In FIG. 5, a plot of Hc vs. CoCr$_{16}$Ta$_4$ alloy nucleation layer cathode power density is shown for a fixed thickness of CrV$_{50}$ (e.g., 50 at % V in Cr), underlayer and CoCr$_{15}$Ta$_4$Pt$_5$ magnetic layer. (For alloy materials subscripts denote atomic %, with the balance of the alloy composed of the non-subscripted element) All the layers were deposited by RF sputtering at pressure of 7 mTorr in pure Argon atmosphere. The deposition was done in an model SHD14S in-line sputter system manufactured by Ulvac Corporation, Japan. This machine is a commercially available production in-line sputter system, and the disks are loaded onto pallets which travel past sets of cathodes at a continuous speed, to be deposited with various layers. Typically, the travel speed of the pallet is between 300–400 mm/min. The substrates used were circumferentially textured Nip plated aluminum substrate with AFM roughness of about 10 Å Ra. No substrate bias was applied to the disk during deposition of all the layers. The substrates were also heated in this example to around 220° C. just before the deposition of the CrV$_{50}$ layer. In other embodiments the substrate may preferably be heated to a temperature in the range of approximately 140° C. to 250° C., although temperatures outside of this range may be used. In general, the method of the present invention requires lower temperatures than prior art methods for achieving high in-plane orientation.

The size of the sputtering targets used for depositing the individual layers is 590 mm high by 200 mm wide. The power input into the cathode divided by the area of the target is the power density in units of watts/cm$^2$. The higher the power or power density, the thicker the film becomes. Another means of monitoring the relative efficiency of the cathode in converting the power input to actual deposition rate is the cathode bias voltage. This is the voltage that develops on the cathode relative to ground as RF power is input into the target. The voltages shown in the Figure are the actual cathode voltages measured at the power density. There is a non-linear dependence of power or power density to the cathode bias voltage. At low power input and consequently within the low deposition rate regime, the bias voltage is a sensitive means of monitoring the behavior of the cathode. The plot shows Hc as function of varying the thickness of CoCrTa nucleation layer from zero power up to near 2 watts/cm$^2$, while keeping the CrV$_{50}$ and CoCrPtTa magnetic layer thickness and deposition conditions the same. CrV$_{50}$ thickness was around 195 Å, while CoCrTaPt magnetic layer thickness was around 230 Å for an MrT of about 0.95 memu/cm$^2$.

At zero thickness of CoCrTa, the Hc is very low at 300 Oe. As soon as very thin layer of CoCrTa is placed between the CrV$_{50}$ and CoCrPtTa layers, the Hc immediately climbs up. At cathode voltage of −400 volts, Hc is around 2700 Oe, and 3000 Oe at cathode bias voltage of −600 volts. CoCrTa thickness at a bias voltage of −400 V is estimated to be around 5 Å and at a bias voltage of −600 V is estimated to be between 12 to 15 Å. It is quite difficult to establish the true film thickness at these thin thickness regimes, and the estimate is based on extrapolation from higher cathode powers (i.e. at higher film thicknesses) and by direct observation of the films in cross-section by transmission electron microscopy. At −800 volts, the Hc decreases to around 2800 Oe, and levels off thereafter. The estimated thickness of the CoCrTa nucleation layer for each point is indicated in FIG. 5. Relative sputter rates of the films are as follows. Both the CrV$_{50}$ and the CoCrTaPt layers were sputtered at the rate of about 7 Å/sec at −2000 volts cathode bias or 3 watts/cm$^2$ power density. The sputter rate of the CoCrTa film at a cathode bias voltage of −600 volts is estimated to be less than 0.5 Å/sec.

FIG. 6 shows in-plane VSM (vibrating sample magnetometer) trace of the hysteresis loop for a sample with zero CoCrTa nucleation layer thickness deposited under the same conditions as the sample shown in FIG. 5. The Hc is very low as indicated in FIG. 5. FIG. 7 shows the same film of FIG. 6 measured in the vertical direction by VSM, where the applied field is directed perpendicular to the film plane. The hysteresis loop taken in this manner is usually called the "vertical loop". The parallelepiped loop is very characteristic of a film which has its cobalt-alloy c-axis directed vertical to the film plane. In other words, the film is strongly perpendicular. This result is quite remarkable in that despite using a CrV$_{50}$ underlayer which is generally believed in the art to have better lattice match to the CoCrTaPt than a pure Cr layer as indicated in the literature (see, e.g. U.S. Pat. No. 4,652,499), the sputter condition used here created a preferred orientation of HCP $(0002)_{Co}$ alloy texture which is contrary to the usual expectations of epitaxial growth on the $(200)_{Cr}$. It shows again that depositing the Co alloy film at high rate can cause perpendicular orientation of the c-axis which is its natural tendency in the absence of epitaxy. The condition of the vacuum system and the process, such as the presence of residual gas in the chamber apparently has a strong effect on the CrV$_{50}$ underlayer surface which counteracts the supposed tendency for better lattice match with the cobalt alloy film. Such tendencies however are erased by the use of thin nucleation layer as shown.

FIG. 8 shows in-plane VSM hysteresis loop for the case where the CoCrTa cathode bias was set to −600 volts for the thickness of the nucleation layer of approximately 12 to 15 Å as shown in FIG. 5. The in-plane hysteresis loop shows excellent squareness and high Hc, indicative of good in-plane c-axis orientation of the cobalt alloy hexagonal crystal structure. The complementary vertical orientation hysteresis loop in FIG. 9 shows a "collapsed" loop which is indicative of a hard axis of switching in the vertical direction, which is again a good indication of an in-plane c-axis orientation. VSM analysis of −400 volts cathode bias condition in FIG. 5 (not shown) also shows well-developed in-plane orientation hysteresis loop, indicating the effectiveness of having CoCrTa nucleation layer in promoting the in-plane orientation of the cobalt alloy crystals, even though at −400 volts, we estimate that thickness of CoCrTa to be around 5 Å. At this thickness, the deposition rate is less than 0.2 Å/second.

FIG. 10 is a plot of magnetization thickness product (MrT) vs. the CoCrTa nucleation layer cathode power density for a fixed thickness of the CoCrTaPt magnetic layer. The samples from which this data were obtained are the same as those used to generate the data shown in FIG. 5. Cathode bias voltages for each data point are also indicated in the Figure. The plot shows a rapid MrT increase from 0.54 memu/cm$^2$ to about 0.95 memu/cm$^2$ for CoCrTa thickness going from zero bias to −600 V bias. Then, leveling off to a slower rate of increase between −600 to −1200 volts cathode bias. VSM results show that hysteresis loop squareness improves over the range from 0 to −600 volt bias, so that rapid change in MrT from 0 to −600 volts is actually due to transition from vertical orientation of the magnetic film to the in-plane orientation rather than from additional contribution to MrT from the CoCrTa nucleation layer. After −600 volts cathode bias voltage, the slow increase in MrT is from the additional contribution to the remanence from the CoCrTa film itself.

The results shown in FIGS. 5 to 10 indicate the dramatic change that takes place in the orientation of the top CoCrTaPt magnetic layer with the placement of a very thin CoCrTa nucleation layer below. The CrV$_{50}$ film is oriented in the proper $(200)_{Cr}$ texture, but in the absence of the nucleation layer, CoCrPtTa by itself has some difficulty establishing the in-plane orientation. We believe that the problem is in the fast rate of deposition of the CoCrPtTa magnetic layer. When the rate is high and vacuum condition is only moderate, the film apparently has difficulty establishing a good epitaxy with the CrV$_{50}$ alloy layer so that it takes on the orientation which it naturally favors, which is the $(0002)_{Co}$ orientation as cited in paper by H. Tsai et al. described previously. By depositing a CoCrTa nucleation layer at slow deposition rate on CrV$_{50}$, there is much better chance of approaching near equilibrium growth condition so that CoCrTa has a chance to establish the proper epitaxy for the in-plane c-axis orientation. Once this has been accomplished, the CoCrTaPt can be then deposited at much higher rate and still maintain the in-plane orientation established earlier by the CoCrTa nucleation layer.

FIG. 11 is a plot of Hc vs. CrV$_{50}$ thickness (plotted as power density) for a fixed CoCrTa nucleation layer thickness of between 12 to 15Å (at −600 volts cathode bias voltage) and CoCr$_{15}$Ta$_4$Pt$_5$ layer thickness of around 230 Å. At a power density of around 2 watts/cm$^2$ or cathode bias voltage of around −1700 volts, the Hc reaches around 2700 Oe, and at 3 watts/cm$^2$, Hc is slightly less than 3000 Oe. The CrV$_{50}$ thickness at 2 and 3 watts/cm$^2$ corresponds to about 140 Å and 195 Å respectively. The fact that such high Hc is obtained at very low thickness of CrV$_{50}$ and relatively low platinum content of 5 atomic % is a good indication that a high level of perfection has been achieved in the crystallinity of the CoCrTaPt alloy grains, and that high anisotropy constant, Ku has been attained. It is also remarkable that high Hc has been obtained under a moderate vacuum conditions of around 10$^{-6}$ Torr in a commercial deposition system.

FIG. 12 is a plot of Hc vs. CoCr$_{16}$Ta$_4$ nucleation layer power density for a pure Cr underlayer thickness of 230 Å and using CoCr$_{15}$Ta$_5$Pt$_3$ magnetic alloy layer with a thickness of around 230 Å. The substrate was heated to approximately 160° C. prior to deposition of the Cr underlayer. Otherwise, the deposition conditions were very similar to those described for FIG. 5. The Figure shows that at zero CoCrTa power, the Hc is around 1800 Oe, climbing to a maximum of around 2200 Oe at around 0.3 watts/cm² (−400 volts cathode bias voltage). It is interesting to note that at zero power of CoCrTa nucleation layer, the Hc is much higher for the Cr underlayer compared to Hc for $CrV_{50}$ in FIG. 5. However, the maximum Hc attainable with a Cr underlayer is lower than the maximum Hc attainable with a $CrV_{50}$ underlayer. The peak of Hc vs. the CoCrTa power density is also slightly different. These differences are due to lower Pt content in the magnetic alloy for FIG. 12 with 3 atomic % vs. 5 atomic % used in the example of FIG. 5, and differences that arise due to using Cr underlayer vs. $CrV_{50}$ underlayer. The estimated CoCrTa nucleation layer thickness is indicated for each point in FIG. 12. At −400 volts RF bias voltage, the CoCrTa thickness is expected to be around 5 Å. Nevertheless, the effect of the CoCrTa nucleation layer on Hc is clearly seen. With a very small thickness CoCrTa nucleation layer, the Hc increases by more than 350 Oe over the case without the nucleation layer.

FIG. 13 shows the effect of applying −35 volts DC substrate bias on the Hc of the Cr/CoCrTa|CoCrTaPt film structure. Curve A is the same curve as in FIG. 12 reproduced for comparison. Curve A is with no substrate DC bias. Curve B shows the Hc dependence when DC substrate bias is applied only during the CoCrTaPt magnetic layer deposition. Curve C is for the case where DC substrate bias was applied during both CoCrTa and CoCrTaPt magnetic layer deposition. Both Curve B and C show significant difference with that of curve A. The Hc is lower at zero CoCrTa nucleation layer power than for curve A, with Hc at around 1200 and 1400 Oe for curves B and C, respectively. At 0.3 watts/cm² or −400 volts cathode bias however, the Hc reach maximum value at around 2750 Oe for curve B and 2950 Oe for curve C. Thereafter, the Hc declines for both cases. When DC substrate bias is applied during the CoCrTaPt layer deposition, there is more mobility of the depositing species so that there is more opportunity for Cr to segregate to the grain boundaries, leading to improved grain isolation. Additionally, the DC bias helps to improve the crystalline perfection of the grains so that high anisotropy constant Ku is obtained. Both of these effects helps to increase Hc. Additional substrate bias during CoCrTa nucleation layer deposition helps enhance these effects some more, hence the Hc is raised even higher in curve C. In both curves B and C, the effect of providing the thin CoCrTa nucleation layer deposited at very low rates is very obvious.

It is also very interesting to note the effect of substrate bias in the case where there is no CoCrTa layer deposited. The Hc drops much lower for the case where DC bias is applied during magnetic alloy layer deposition than when there was no DC substrate bias applied during this step. In fact the Hc behavior with CoCrTa power density becomes more similar to those seen in $CrV_{50}$ underlayer of FIG. 5, although the Hc drop in $CrV_{50}$ at zero CoCrTa power was much more drastic. It is believed that the Hc drop is due to an adverse surface effect that takes place on the freshly sputtered Cr layer just at the time of magnetic layer deposition as a result of substrate bias. It may be being oxidized or contaminated more severely when the substrate bias is applied which prevents the magnetic layer from orienting properly in the in-plane orientation, hence the film takes on more perpendicular orientation. $CrV_{50}$ layer exhibits the same behavior even in the absence of substrate bias, therefore it must be much more sensitive to surface contamination or oxidation compared to pure Cr. Since substrate bias is an useful and necessary means of achieving high degree of Cr segregation for good grain isolation and also to achieve good crystalline perfection for high $K_u$, the adverse effect that it may cause to Cr is a significant detriment. Depositing the thin layer of CoCr based alloy near equilibrium condition (e.g. slow deposition with high mobility) either prevents the oxidation of Cr layer to take place or makes its impact less on the epitaxial growth of the magnetic layer.

FIGS. 14 and 15 are the in-plane and vertical hysteresis loop respectively for the case where there is no CoCrTa nucleation layer i.e. for samples prepared in the same manner as those shown for curve C in FIG. 13. The loops show a strong indication of vertical orientation, but not quite as strong as it was in the $CrV_{50}$ case. FIGS. 16 and 17 show the in-plane and vertical hysteresis loops, respectively, for the case of −400 V RF cathode bias for the CoCrTa layer. The hysteresis loops indicate a strongly in-plane orientation of the magnetic layer. The results again show that with a pure Cr underlayer, similar results as those in FIG. 5 have been obtained. That is, an ultra-thin layer of CoCrTa film deposited at very slow rate can dramatically improve the in-plane orientation of the magnetic layer, and that very high Hc can be obtained, with even smaller amount of Pt of only 3 atomic % compared to 5% used in the example of FIG. 5.

FIG. 18 is a cross-section transmission electron micrograph showing the thickness and structure of $CoCr_{16}Ta_4$ nucleation layer deposited by itself on a smoothly polished NiP/aluminum substrate at cathode power density of 0.54 watts/cm² (−600 volts RF cathode bias) as was the case in FIG. 5 and FIG. 12. The arrow in the Figure indicates the CoCrTa layer. The CoCrTa forms semi-circular particles of around 12 to 15 Å thickness above the substrate.

As for the importance of epitaxy and epitaxial relationship in the aforementioned media structure, it is probably less important that there is perfect lattice match between the Cr or Cr alloy underlayer and the CoCr based alloy nucleation layer than between the CoCr based alloy and the magnetic layer above it. With Cr being a BCC crystal, there is an inherent mismatch that will always be present with any hexagonal crystal, at least in one direction. A slow deposition of a CoCr based alloy nucleation layer under near equilibrium condition with sufficient mobility is a key factor in arranging for the in-plane orientation of the cobalt alloy structure. As long as Cr or Cr alloy has a proper orientation, e.g. $(200)_{Cr}$, to allow for the cobalt alloy to take on the in-plane orientation, the amount of lattice mismatch with the Cr or Cr alloy does not matter as much. Whether the Cr or Cr alloy has more or less propensity to oxidize or contaminate its surface during the deposition process is much more important. Although this can be alleviated by having ultra-high vacuum as suggested by Takahasi et al. as cited previously, it is not very practical to have ultra-high vacuum in an industrial deposition equipment where productivity and high throughput matter. Therefore a method which alleviates the problem of Cr or Cr alloy contamination or oxidation to the epitaxial growth of the cobalt alloy film is quite significant. What is much more important however is the lattice match between the nucleation layer and the magnetic layer. This is a growth of two hexagonal layer above one another. A small lattice match difference can lead to formation of dislocations and stacking faults which may have detrimental effect on $K_u$ and hence on ultimate Hc. The lattice mismatch for HCP-$CoCr_{16}Ta_4$ and HCP-$CoCr_{15}Ta_5Pt_3$ is much less than 0.5% in any direction however, using published or calculated values for the lattice constants, compared to at least ~2% lattice mismatch between BCC-Cr and HCP-$CoCr_{16}Ta_4$ along the $<0001>_{Co}$ direction, and ~10% along the $<0110>_{Co}$ direction. Therefore the best match can be obtained between layers of the same material, i.e. the same alloy for the nucleation layer and the magnetic layer. However, a small modification of the alloy composition of the nucleation layer, such as without the expensive Pt can also achieve similar results since deletion of 3% Pt from the CoCrTaPt alloy will lead to at most 0.5% change in the lattice parameter.

Table 2 shows the comparison of magnetic recording performance of the media made according to one embodiment of this invention against a conventionally prepared media. The samples shown were all deposited on a set of substrates prepared the same way. The substrate was a 95 mm NiP plated aluminum, with circumferential texture at AFM roughness of 10 Å Ra. The first media (Sample 1) was prepared using a static deposition system using 200 Å thick Cr, a $CoCr_{15}Ta_5Pt_5$ magnetic layer and 100 Å carbon overcoat. The deposition rate was at around 40 Å/sec for the Cr and magnetic layers. An Intevac model MDP250A system made by Intevac, Santa Clara, Calif. was used. In this machine, individual disks are held stationary in front of each cathode for each layer. The substrate was heated to ~250° C. prior to Cr deposition, and substrate DC bias of −300 volts was applied to the magnetic layer. The second sample (Sample 2) was prepared in an in-line deposition system in a manner similar to the present invention, except that it did not include the thin CoCrTa nucleation layer. The structure is $Cr/CoCr_{15}Ta_5Pt_3$/Carbon. The Cr thickness was approximately 400 Å, and the substrate temperature was about 220° C. The carbon thickness was 100 Å. The third sample (Sample 3) was made according to an embodiment of this invention and has 230 Å of Cr underlayer, approximately 12 to 15 Å thick $CoCr_{16}Ta_4$ nucleation layer deposited at −600 volts RF cathode bias voltage, and a $CoCr_{15}Ta_5Pt_3$ magnetic layer, followed by 100 Å of carbon overcoat. The substrate was heated to approximately 160° C. and a DC substrate bias of −30 volts was applied for the CoCrTa and CoCrTaPt layers. The CoCrTa nucleation layer was deposited at a rate of 0.5 Å/sec. Both Cr and CoCrTaPt layers were deposited at the rate of 7 Å/sec. The deposition was done with RF sputtering, at the pressure of 7 mTorr. The machine used was a SHD450 in-line deposition tool made by Ulvac Corp. of Japan. In all cases, magnetic layer thickness was adjusted to achieve an Mrt of approximately 0.7 memu/cm².

Recording performance measurements were taken using a Guzik model RWA 1632/1701 Spinstand, manufactured by Guzik, San Jose, Calif. A magnetoresistive (MR) magnetic recording head manufactured by IBM was used. The disk rpm was 5400, and measurements were made at a radius of 0.83 inches. MR head read bias was 8 mA, and write current was 40 mA zero to peak. The high frequency head signal was 109 Mflux/sec at 230 kfci. The overwrite frequency was 109.95 Mflux/sec over 14.66 Mflux/sec. Write Jitter frequency was 54.98 Mflux/sec. The results show that all three have roughly the same low frequency amplitudes, and Hc is within 150 Oe of each other. Sample 3 with the CoCrTa nucleation layer has the superior performance with the highest resolution, narrowest PW50, lowest write jitter and TNLD. Write jitter is a measure of SNR, and a lower value means lower intrinsic media noise. Squeeze is a measure of track compressibility, and again the media with the thin nucleation layer has the best squeeze performance. Sat S* is a measure of remanent loop squareness as measured by the spin stand at actual recording switching rates. It is a slope of the write saturation curve at the writing frequency. It represents the loop squareness at the recording field switching rate as opposed to VSM hysteresis loop which is obtained at very low sweep rates. Higher values of Sat S* signifies better remanent loop squareness. Again Sample 3 with the thin nucleation layer has the best Sat S*. OW is somewhat comparable to the Sample 1 and lower than Sample 2. This is due to the fact that effective Hc at the recording switching rates of Sample 3 is high, contributing to good squeeze and TNLD, but lowering the OW.

Table 3 shows additional Guzik spin stand recording data comparisons of the media made according to this invention against the media made according to conventional manner. The first sample (Sample 1) is the same first disk as shown in table 1, which was made using Intevac model 250A system. The fourth sample (Sample 4) was made using another static deposition system, a Model C3010 made by Anelva Ltd., Japan. This sample had 200 Å of Cr, a $CoCr_{15}Ta_5Pt_5$ magnetic layer and 100 Å of carbon overcoat. The substrate was heated to around 250° C. just before the Cr layer and substrate bias of −200 volts was applied to the magnetic layer. As in the Intevac system, the Anelva system uses DC magnetron sputtering with sputter rates of around 40 Å/sec for both Cr and magnetic layer. The fifth sample (Sample 5) was made according to an embodiment of the present invention in a similar manner as described for Sample 3 of Table 1. A Cr underlayer of approximately 230 Å was deposited followed by an approximately 12 to 15 Å thick $CoCr_{16}Ta_4$ nucleation layer deposited at −600 volts RF cathode bias voltage. The magnetic layer was a $CoCr_{15}Ta_5Pt_3$ film, followed by 100 Å of carbon overcoat. DC substrate bias of −60 volts was applied for both CoCrTa and CoCrTaPt layers, and the substrate temperature before the Cr layer deposition was around 160° C. The CoCrTa nucleation layer was deposited at a rate of 0.5 Å/sec. Both Cr and CoCrTaPt layers were deposited at the rate of 7 Å/sec. The sixth sample (Sample 6) is media with isotropic orientation of cobalt alloy c-axis in the film as opposed to in-plane orientation for the other three samples. This media was made with 20 Å thick sputtered NiP layer, followed by a $CoCr_{11}Pt_{13}(SiO_2)_8$ alloy magnetic layer and 100 Å thick carbon overcoat. No substrate heating was applied in this case.

Again, in all of the above samples, the magnetic layer thickness was adjusted to achieve an Mrt of approximately 0.7 memu/cm². The testing conditions used in this comparison used a similar IBM head but at 216 kfci recording conditions. The test radius was changed to 0.984 inches. Although the MrT of the media was approximately the same in all three samples, the Hc was different for some of the samples as indicated in the table. The Guzik test results show the following. For resolution, $PW_{50}$, write jitter, TNLD, Squeeze and Sat S*, the Sample 5 media with the thin CoCrTa nucleation layer has exceptionally good performance. The Intevac sample (Sample 1) has the higher OW, but this is explained by the lower Hc of the media. Consequently, it also has the poorest squeeze performance. In fact the OW for the high Hc of the thin nucleation layer media is still exceptionally good. The Sample 6 isotropic media has low $PW_{50}$ and write jitter, and good squeeze performance, but the resolution, TNLD and Sat S* are all poor compared to other media. The results show that thin nucleation layer media can achieve an excellent level of recording performance across all of the key parametric parameters compared to the media prepared by current art.

In conclusion, the media made according to the invention has excellent recording performance compared to those of previous art. Highest possible Hc is obtained for a given Pt content in the alloy and excellent in-plane orientation of c-axis of the CoCrPt based magnetic alloy layer. These properties can be obtained in an commercially available production deposition equipment with moderate vacuum capabilities. The process is amenable to high throughput production so that it is highly economical and low cost.

Those skilled in the art can use this invention to magnetron sputtering or to RF sputtering method where the deposition of the nucleation layer can be slowed so as to obtain the necessary low deposition rate. Near equilibrium conditions can be obtained through the use of conditions promoting high mobility of the depositing species such as use of DC or RF substrate bias or substrate heating or a combination of both.

It will be appreciated that modifications to the above described embodiments can be made by one of ordinary skill in the art. For example, within the teachings set forth herein, differing thicknesses or compositions of one or more of the layers, additional layers, differing deposition systems or differing conditions such as temperature, bias voltages, power levels, etc. may be used.

As described herein, the present inventors have discovered methods of producing relatively high coercivity films— i.e. films whose coercivity exceeds that of prior art films taking into consideration one or more factors such as relative platinum percentage in the film, underlayer composition and thickness, and deposition conditions. With the present invention, for any given coercivity level, a film according to the present invention provides more flexibility to the manufacturer. For example, depending upon design and production goals, for a given coercivity the present invention provides the flexibility to choose one or more of: a lower platinum concentration of the magnetic film; a thinner thickness of an underlayer such as chromium, a lower lattice match between a chromium containing underlayer and a subsequent layer, and a more commercially feasible (i.e. higher) base pressure in the sputtering system as compared with the prior art. Additionally, the high quality of the film, small grain size, and segregation of components such as chromium provide low noise, low TNLD, good resolution and PW50, and improved OW.

While not wishing to be bound by theory, as described above it is believed that the present invention provides these benefits by providing for controlled crystal growth of the nucleation layer. It is believed that by forming the nucleation layer in equilibrium or near equilibrium conditions, and by providing for mobility at the growing surface, the atoms forming it are able to grow in stable, low energy sites as the layer grows. Because of this, incorporation of the desired components from the sputtering target is favored as compared with incorporation of undesired contaminants such as oxygen, which are believed to be pushed to the grain boundaries during growth. As a result, fine grains grow with few imperfections. Once this nucleation layer having a high quality crystal structure is formed, a subsequent magnetic layer can be grown at commercially viable rates with the above-described desirable properties.

The conditions which are believed to lead to the growth of a high quality film include the use of a nucleation layer deposited at a relatively slow growth rate, bias on the substrate during film growth, use of RF sputtering, and use of heating during film deposition. These conditions help achieve equilibrium or near equilibrium growth and/or provide mobility to the atoms arriving at the surface for the nucleation layer. It should be noted that these factors may be inter-dependent. For example, faster growth rates than the preferred rates described above may be used in combination with greater heating and/or a higher bias on the substrate. As described above, by use of RF sputtering, very low growth rates and substrate bias, high coercivity films may be obtained at temperatures that are moderate compared with the prior art.

It should be noted that regardless of whether different or additional mechanisms are present than those described herein, the present invention teaches several advantageous methods of producing magnetic media, that may be used alone or in combination. For example, use of a low growth rate for the nucleation layer results in a high coercivity film relative to the prior art. As has been shown herein, use of a low voltage applied to the nucleation layer target cathode during sputtering, and therefore use of a relatively low power density, results in a film with the described desirable properties.

Additionally, use of an extremely thin nucleation layer according to the present invention is advantageous. As seen in FIG. 5 for example, an extremely low thickness of the nucleation layer results in the maximum coercivity value. It should be noted that use of a very thin nucleation layer that achieves the results of the present invention is advantageous even if a maximum is not reached at very low thickness as in FIG. 5, because use of a very low thickness reduces throughput time, material usage and maintenance costs. Note that the although some of the prior art discussed earlier teaches a thin intermediate layer for lattice matching, this alone does not provide a rationale to use thicknesses described herein. For prior art teaches intermediate layers used for lattice match, it is generally believed that the thickness should be such that it does not contribute significantly to the magnetic properties, and there is no teaching to go any thinner than necessary. This is because prior art films generally have the poorest crystal structure at the interface, and a greater thickness allows the intermediate layer crystal structure to improve. Therefore, it is generally believed to be advantageous to use the highest thickness that does not significantly affect the overall magnetic properties.

Tables:

TABLE 1

Compares lattice mismatch between $CoCr_{10}Pt_{18}$ alloy with pure Cr. Lattice mismatch for various planes of Cr and $CoCr_{10}Pt_{18}$

| Cr texture | $CoCr_{10}Pt_{18}$ texture | Mismatch | c-axis |
|---|---|---|---|
| (110) | (10$\bar{1}$1) | 0.2% and 2%) | 28° out of plane |
| (110) | (10$\bar{1}$0) | 1.7% and 11% | in plane |
| (200) | (11$\bar{2}$0) | 1.7% and 9% | in plane |
| (211) | (10$\bar{1}$0) | 1.7% and 2% | in plane |
| (111) | ($\bar{3}$120) | 1.7% and 4% | in plane |
| (221) | (10$\bar{1}$0) | 1.7% and 4% | in plane |
| (210) | no good match in either direction | | |

TABLE 2

Guzlk Recording test

| Media | Hr | MrT (memu/cm²) | HF mVpp | MF mVpp | LF mVpp | Res % | PW50 ns | OW dB | Wrt Jtr nm | TNLD % | Squeeze % | Sat S* |
|---|---|---|---|---|---|---|---|---|---|---|---|---|
| Sample #1 (Intevac) | 2600 | 0.70 | 0.126 | 0.421 | 0.562 | 22.50 | 21.98 | 36.89 | 3.40 | 13.70 | 37.16 | 0.69 |
| Sample #2 (Ulvac) | 2450 | 0.70 | 0.131 | 0.444 | 0.598 | 21.93 | 22.10 | 37.85 | 3.30 | 13.66 | 32.75 | 0.69 |
| Sample #3 (Ulvac/CoCrTa nucleation layer) | 2609 | 0.67 | 0.147 | 0.457 | 0.592 | 24.87 | 20.87 | 37.04 | 2.91 | 12.33 | 40.00 | 0.74 |

236 kfci testing oondition
Head: IBM CH-T15
5400 rpm
Test at 0.83" radius
HF = 234 Kfci = 109.95 Mflux/s
MF = 54.98 Mflux/s
LF = 21.98 Mflux/s
OW HF/LF = 109.95/14.66 Mflux/s

TABLE 3

Guzlk Recording test

| Media | Hr | MrT (memu/cm²) | HF mVpp | MF mVpp | LF mVpp | Res % | PW50 ns | OW dB | Wrt Jtr nm | TNLD % | Squeeze % | Sat S* |
|---|---|---|---|---|---|---|---|---|---|---|---|---|
| Sample #1 (Intevac) | 2600 | 0.70 | 0.181 | 0.510 | 0.635 | 28.49 | 17.72 | 41.77 | 3.22 | 22.16 | 45.98 | 0.693 |
| Sample #4 (Anelva) | 2460 | 0.63 | 0.172 | 0.500 | 0.620 | 27.77 | 17.85 | 37.18 | 3.11 | 21.65 | 58.32 | 0.659 |
| Sample #5 (Ulvac/CoCrTa nucleation layer) | 2900 | 0.70 | 0.209 | 0.539 | 0.635 | 32.85 | 16.52 | 38.41 | 2.93 | 20.27 | 61.68 | 0.766 |
| Sample #6 (Ulvac/Isotropic media) | 2600 | 0.68 | 0.191 | 0.531 | 0.631 | 30.33 | 16.49 | 34.04 | 2.99 | 24.46 | 61.20 | 0.617 |

216 Kfci testing condition
Head: IBM
5400 rpm
Test at 0.984" radius
HF = 216 Kfci = 120 Mflux/s
MF = 60 Mflux/s
LF = 20 Mflux/s
OW HF/LF = 120/10 Mflux/s

What is claimed is:

1. A method of producing a magnetic recording medium comprising the steps of:
providing a substrate;
depositing an underlayer comprising chromium;
depositing a first layer comprising a cobalt alloy over said underlayer;
depositing a second layer comprising a cobalt platinum alloy over said first layer;
wherein said first layer is deposited under a condition of equilibrium or near equilibrium crystal growth.

2. The method of claim 1 wherein said first layer is grown under one or more of conditions selected from the group consisting of: lower deposition rate of said first layer than said second layer, heating of said substrate during deposition of said first layer, RF sputtering of said first layer, and applying a bias voltage to said substrate during deposition of said first layer.

3. The method of claim 1 wherein said first layer is deposited such that sputtered species forming said first layer have a mobility as said species are deposited such that said species grow in stable sites as said first layer is deposited.

4. The method of claim 1 wherein said first layer is deposited such that sputtered species forming said first layer have a mobility as said species are deposited such that said species grow in stable sites as said first layer is deposited.

5. The method of claim 1 wherein said first layer is deposited at a rate of 1 Å per second or less.

6. The method of claim 5 wherein said first layer is deposited at a rate of 0.5 Å per second or less.

7. The method of claim 1 wherein said first layer is deposited to a thickness of 20 Å or less.

8. The method of claim 7 wherein said first layer is deposited to a thickness of 20 Å or less.

9. The method of claim 1 wherein said second layer is deposited at a higher rate than said first layer.

10. The method of claim 9 wherein said second layer is deposited at rate equal to or greater than 2 times that of said first layer.

11. The method of claim 1 wherein said underlayer exhibits a primarily {200} texture in the plane of the film.

12. The method of claim 11 wherein said second layer exhibits a primarily {11$\bar{2}$0} texture in the plane of the film.

13. The method of claim 11 wherein said first layer further comprises chromium and tantalum and said second layer further comprises chromium and tantalum.

14. The method of claim 1 wherein said second layer comprises said platinum in an amount of 6% or less, and wherein said medium has an in-plane coercivity of 2500 Oe or greater.

15. The method of claim 1 wherein said first layer and said second layer have substantially the same composition.

16. The method of claim 1 wherein said first layer is deposited using a power density on a sputter target of 1.0 W/cm² or less.

17. A method of producing a magnetic recording medium comprising the steps of:

providing a substrate;
depositing an underlayer comprising chromium;
depositing a first layer comprising a cobalt alloy over said underlayer;
depositing a second layer comprising a cobalt platinum alloy over said second layer;
wherein said first layer is deposited at a rate of less than 1 Å per second.

18. The method as described in claim 17 wherein said first layer is deposited at a rate of 0.75 Å per second or less.

19. The method as described in claim 17 wherein said first layer is deposited at a rate of 0.5 Å per second or less.

20. The method as described in claim 17 wherein said first layer is deposited to a thickness of 20 Å or less.

21. The method as described in claim 17 wherein said chromium underlayer is deposited on a surface of said substrate in a non-epitaxial relationship.

22. The method as described in claim 17 wherein said first layer is deposited by RF sputtering.

23. The method as described in claim 17 wherein a dc bias is applied to said substrate during at least a portion of said step of depositing said first layer.

24. The method of claim 17 wherein said first layer is deposited using a power density on a sputter target of 1.0 W/cm$^2$ or less.

25. A method of producing a magnetic recording medium comprising the steps of:
providing a substrate;
depositing an underlayer comprising chromium;
depositing a first layer comprising a cobalt alloy over said underlayer;
depositing a second layer comprising a cobalt platinum alloy over said second layer;
wherein said first layer is deposited at a lower deposition rate than said second layer.

26. The method as described in claim 25 wherein said first layer is deposited at a rate of 1 Å per second or less.

27. The method as described in claim 17 wherein said first layer is deposited at a rate of 0.5 Å per second or less.

28. The method of claim 26 wherein said first layer is grown under one or more of conditions selected from the group consisting of: lower deposition rate of said first layer than said second layer, heating of said substrate during deposition of said first layer, RF sputtering of said first layer, and applying a bias voltage to said substrate during deposition of said first layer.

29. The method of claim 25 wherein said first layer is deposited such that sputtered species forming said first layer have a mobility as said species are deposited such that said species grow in stable sites as said first layer is deposited.

30. The method of claim 28 wherein said first layer is deposited such that sputtered species forming said first layer have a mobility as said species are deposited such that said species grow in stable sites as said first layer is deposited.

31. A method of producing a magnetic recording medium comprising the steps of:
providing a substrate;
depositing an underlayer comprising chromium;
depositing a first layer comprising a cobalt alloy over said underlayer;
depositing a second layer comprising a cobalt platinum alloy over said second layer;
wherein said first layer is deposited by a method comprising applying power to a target cathode, wherein said power is applied to said target cathode at a density of 1.0 W/cm$^2$ or less.

32. The method of claim 31 wherein said density of said power applied to said target cathode is 0.75 W/cm$^2$ or less.

33. The method of claim 1 wherein said chromium underlayer further comprises one or more elements selected from the group consisting of: Ti, V, Mo, Nb, W and Ta.

34. The method of claim 1 wherein said first layer further comprises one or more elements selected from the group consisting of: Ti, V, Mo, Nb, W, Ta, Pt, Ni, Pd, Zr and Hf.

35. The method of claim 1 wherein said second layer further comprises one or more elements selected from the group consisting of: Ti, V, Mo, Nb, W, Ta, Pt, Ni, Pd, Zr and Hf.

36. A magnetic recording medium formed on a substrate comprising:
an underlayer comprising chromium;
a first layer comprising a cobalt alloy disposed on said underlayer;
a second layer comprising a cobalt platinum alloy disposed on said first layer;
wherein said first layer is deposited under conditions of equilibrium or near equilibrium crystal growth.

37. The magnetic recording medium of claim 36 wherein said first layer is deposited to a thickness of 20 Å or less.

38. The magnetic recording medium of claim 36 wherein said underlayer exhibits a primarily {200} texture in the plane of the film.

39. The magnetic recording medium of claim 38 wherein said second layer exhibits a primarily {1120} texture in the plane of the film.

40. The magnetic recording medium of claim 39 wherein said first layer further comprises chromium and tantalum.

41. The magnetic recording medium of claim 36 wherein said second layer further comprises chromium and tantalum.

42. A disk drive comprising the magnetic medium of claim 35.

43. A disk drive comprising the magnetic medium of claim 36.

44. The method as described in claim 1 wherein said first layer and said second layer comprise crystals having a c-axis, said c-axis having a primarily in-plane orientation.

45. The method as described in claim 17 wherein said first layer and said second layer comprise crystals having a c-axis, said c-axis having a primarily in-plane orientation.

46. The method as described in claim 31 wherein said first layer and said second layer comprise crystals having a c-axis, said c-axis having a primarily in-plane orientation.

47. The magnetic recording medium described in claim 36 wherein said first layer and said second layer comprise crystals having a c-axis, said c-axis having a primarily in-plane orientation.

48. The method of claim 25 wherein said second layer is deposited at a rate equal to or greater than two times that of said first layer.

49. The method of claim 26 wherein said second layer is deposited at a rate equal to or greater than two times that of said first layer.

50. The method of claim 28 wherein said second layer is deposited at a rate equal to or greater than two times that of said first layer.

51. The method of claim 29 wherein said second layer is deposited at a rate equal to or greater than two times that of said first layer.

52. The method of claim 30 wherein said second layer is deposited at a rate equal to or greater than two times that of said first layer.

* * * * *

UNITED STATES PATENT AND TRADEMARK OFFICE
CERTIFICATE OF CORRECTION

PATENT NO. : 6,150,015
DATED : November 21, 2000
INVENTOR(S) : Bertero et al.

It is certified that error appears in the above-identified patent and that said Letters Patent is hereby corrected as shown below:

Column 27,
Line 6, "over said second layer" should read -- over said first layer --.
Line 33, "over said second layer" should read -- over said first layer --.
Line 63, "over said second layer" should read -- over said first layer --.

Signed and Sealed this

Fourteenth Day of May, 2002

Attest:

JAMES E. ROGAN
Attesting Officer    Director of the United States Patent and Trademark Office

UNITED STATES PATENT AND TRADEMARK OFFICE
CERTIFICATE OF CORRECTION

PATENT NO.  : 6,150,015
DATED       : November 21, 2000
INVENTOR(S) : Bertero et al.

It is certified that error appears in the above-identified patent and that said Letters Patent is hereby corrected as shown below:

Column 26,
Line 45, "20" should be -- 10 --.

Signed and Sealed this

Twenty-sixth Day of July, 2005

JON W. DUDAS
*Director of the United States Patent and Trademark Office*